(12) United States Patent
Zhang

(10) Patent No.: US 10,390,281 B2
(45) Date of Patent: Aug. 20, 2019

(54) SERVICE PROCESSING METHOD AND ELECTRONIC DEVICE

(71) Applicant: Yulong Computer Telecommunication Scientific (Shenzhen) Co., Ltd., Shenzhen, Guangdong (CN)

(72) Inventor: Zhigang Zhang, Guangdong (CN)

(73) Assignee: NANCHANG COOLPAD INTELLIGENT TECHNOLOGY COMPANY LIMITED, Nanchang, Jiangxi Province (CN)

(*) Notice: Subject to any disclaimer, the term of this patent is extended or adjusted under 35 U.S.C. 154(b) by 78 days.

(21) Appl. No.: 15/608,113

(22) Filed: May 30, 2017

(65) Prior Publication Data
US 2017/0265118 A1  Sep. 14, 2017

Related U.S. Application Data

(63) Continuation-in-part of application No. PCT/CN2014/092487, filed on Nov. 28, 2014.

(51) Int. Cl.
| | |
|---|---|
| H04W 36/14 | (2009.01) |
| H04W 60/04 | (2009.01) |
| H04W 76/10 | (2018.01) |
| H04W 36/38 | (2009.01) |
| H04W 36/00 | (2009.01) |

(52) U.S. Cl.
CPC ..... *H04W 36/385* (2013.01); *H04W 36/0066* (2013.01); *H04W 36/14* (2013.01);
(Continued)

(58) Field of Classification Search
None
See application file for complete search history.

(56) References Cited

U.S. PATENT DOCUMENTS

| | | | |
|---|---|---|---|
| 2012/0122459 A1 | 5/2012 | Wu et al. | |
| 2014/0185586 A1* | 7/2014 | Wu | H04W 36/0022 370/331 |

(Continued)

FOREIGN PATENT DOCUMENTS

| | | |
|---|---|---|
| CN | 102045803 A | 5/2011 |
| CN | 103139852 A | 6/2013 |

(Continued)

OTHER PUBLICATIONS

Watfa et al.—PRO 62017628, Methods and apparratus for selection of dedicated core network nodes, Jun. 26, 2014.*

(Continued)

*Primary Examiner* — Brandon M Renner
*Assistant Examiner* — The Hy Nguyen
(74) *Attorney, Agent, or Firm* — Troutman Sanders LLP

(57) ABSTRACT

The present disclosure provides a terminal that comprises: a call setup unit, for carrying out a voice call setup procedure on the first communication network if a call request is received when data service is being carried out by using the first communication network; an interaction unit, for receiving circuit resource information of the second communication network required for establishing voice service corresponding to the call request; a processing unit, for sending an answer response to a mobility management entity, disconnecting the data service of the first communication network according to the received voice fallback information, and establishing voice service of the second communication network by using the received circuit resource information, if it is detected that an answer button of the terminal is selected after the voice call setup procedure is completed. Correspondingly, the present disclosure also provides a mobility management entity, a mobile switching center, a service processing method and a service processing (Continued)

system. By means of the present technical solution, whether to carry out a circuit domain fallback is determined according to whether a user answers a call, so that the data service is not affected when the user does not answer the call.

11 Claims, 7 Drawing Sheets

(52) U.S. Cl.
CPC .... *H04W 36/0016* (2013.01); *H04W 36/0022* (2013.01); *H04W 60/04* (2013.01); *H04W 76/10* (2018.02)

(56) References Cited

U.S. PATENT DOCUMENTS

| | | | |
|---|---|---|---|
| 2016/0014642 A1* | 1/2016 | Liang | H04W 36/0022 370/331 |
| 2016/0029269 A1* | 1/2016 | Tamura | H04W 36/0022 455/436 |
| 2017/0188280 A1* | 6/2017 | Watfa | H04W 36/0055 |

FOREIGN PATENT DOCUMENTS

| | | |
|---|---|---|
| CN | 103609168 A | 2/2014 |
| WO | 2011107041 A2 | 9/2011 |

OTHER PUBLICATIONS

International Search Report dated Aug. 14, 2015 issued in International Application No. PCT/CN2014/092487 and English Translation.

International Preliminary Report on Patentability and Written Opinion of the International Searching Authority dated Aug. 14, 2015 issued in International Application No. PCT/CN2014/092487 and English Translation.

\* cited by examiner

SERVICE PROCESSING METHOD AND ELECTRONIC DEVICE

CROSS REFERENCE

The present application is a continuation-in-part of International Application No. PCT/CN2014/092487, Filed on Nov. 28, 2014, the entire content of which is incorporated herein by reference.

TECHNICAL FIELD

The present disclosure relates to the technical field of terminals, in particular relates to a service processing method and an electronic device.

BACKGROUND

Call Service Fall Back (CSFB) is a technology used by LTE (Long Term Evolution) to provide voice service, by instructing a terminal to fall back from an LTE network to a 2G or 3G network. The called terminal makes a response after receiving a call request sent by an MME (Mobility Management Entity), the MME in cooperation with an MSC (Mobile Switching Center) instructs the terminal to fall back to a 2G or 3G network through eNB, and then the terminal carries out a voice call setup procedure on the 2G or 3G network.

In a traditional CSFB solution, immediately after receiving the call request, the terminal falls back to the 2G or 3G network to start a call setup procedure and receive OTA (Over-the-Air technology) messages such as SETUP (update) information. It is only through the SETUP information that the called terminal is able to know the calling party, and even if the terminal does not want to answer this call, because the terminal has already fallen back to the 2G or 3G network with a smaller bandwidth, the data service running on LTE, such as video call service, has already been affected or directly interrupted.

Therefore, a new technical solution is needed, which can determine whether to carry out a circuit domain fallback according to whether a user answers a call, so that the data service is not affected when the user does not answer the call, thereby improving user experience.

SUMMARY OF THE DISCLOSURE

The present disclosure provides a new technical solution to solve the above-mentioned problem, which can determine whether to carry out a circuit domain fallback according to whether a user answers a call, so that the data service is not affected when the user does not answer the call, thereby improving user experience.

In view of this, the present disclosure provides a terminal that comprises a first communication network module, configured to correspond to a first communication network that only supports data service; and a second communication network module, configured to correspond to a second communication network that at least supports voice service; wherein, the terminal further comprises a call setup unit, for carrying out a voice call setup procedure on the first communication network if a call request from a mobility management entity is received when data service is being carried out by using the first communication network; an interaction unit, for receiving circuit resource information of the second communication network required for establishing voice service corresponding to the call request sent by the mobility management entity; a processing unit, for sending an answer response to the mobility management entity, disconnecting the data service of the first communication network according to voice fallback information received from the mobility management entity, and establishing voice service of the second communication network by using the received circuit resource information, if it is detected that an answer button of the terminal is selected after the voice call setup procedure is completed.

In this technical solution, when data service is being carried out on the first communication network that only supports data service, if call request is received, a voice call setup procedure is carried out on the first communication network by carrying out negotiation between the terminal and the mobile switching center on the first communication network, and the incoming call information is displayed on the terminal for the user to know, so that the user can choose whether or not to answer the call. When the user selects the answer button, the data service of the first communication network is disconnected, and voice service is established on the second communication network that supports the voice service. As a result, it is only when the user answers the incoming call that the network falls back from the first communication network to the second communication network, and when the user does not answer the incoming call, the first communication network is not disconnected, so that the ongoing data service is not affected when the user does not answer the call. In the meantime, because the voice service is established directly by using the received circuit resource information, as the circuit resource is readily available, the fallback can be completed very quickly.

Wherein, the first communication network may be an LTE network, the second communication network may be a 2G or 3G network. As such, when the user of the terminal is conducting data service on the LTE network, if a call request from a mobility management entity is received, then a voice call setup procedure is carried out on the LTE network, so that, without disconnecting the data service of the LTE network, the incoming call information can be displayed on the terminal for the user to decide whether or not to answer the incoming call. When the user answers the call, the network falls back from the LTE network to the 2G or 3G network. When the user does not answer the call, voice fallback is not performed, so that the ongoing data service is not affected when the user does not answer the call, thereby improving user experience.

In the above-mentioned technical solution, preferably, the interaction unit is further for sending a call response to the mobility management entity when the call request is received, wherein, the call response comprises an identifier for indicating whether the voice call setup procedure can be completed on the first communication network, in order for the mobility management entity to judge whether the completion of the voice call setup procedure on the first communication network is supported according to the identifier.

In this technical solution, the call response comprises an identifier for indicating whether the voice call setup procedure can be completed on the first communication network, wherein the identifier may be an identifier bit.

In the above-mentioned technical solution, preferably, the call setup unit comprises: an information receiving unit, for receiving parameter information required to carry out the voice call setup procedure sent by the mobility management entity when it is judged that the completion of the voice call setup procedure on the first communication network is supported; a procedure setup unit, for carrying out the voice call setup procedure on the first communication network according to the parameter information.

In this technical solution, when the mobility management entity received the call response with the identifier, i.e. the identifier bit, it will judge whether this identifier bit is supported, and when this identifier bit is judged as being supported, the mobility management entity will send the parameter information required for the voice call setup procedure to the terminal. The mobility management entity will also send the circuit resource information of another communication network required for establishing voice service corresponding to the call request, so as to prepare for establishing the voice service when the user later chooses to answer the call.

In the above-mentioned technical solution, preferably, the parameter information comprises system information, location update response information, routing area update response information, and/or SETUP information of an area where the second communication network is located.

In this technical solution, the parameter information includes but not limited to one or more of system information, location update response information, routing area update response information, and/or SETUP information of an area where the second communication network is located.

In the above-mentioned technical solution, preferably, the interaction unit is further for sending a location update request and a routing area update request to the mobility management entity after receiving the system information, and receiving the location update response information and the routing area update response information sent by the mobility management entity in accordance with the location update request and the routing area update request.

In this technical solution, if location update and routing area update needs to be completed by the mobile switching center and the terminal, the OTA messages required to carry out these two procedures are also encapsulated by the mobility management entity and relayed between the terminal and the mobile switching center.

In the above-mentioned technical solution, preferably, the voice call setup procedure comprises receiving the SETUP information sent by the mobility management entity, wherein, the SETUP information comprises identification information, encoding mode information, and frequency band resource information sent by another terminal that sends the call request; identifying the SETUP information for sending a SETUP response to the mobility management entity according to the identification result; and receiving call reminder information sent by the mobility management entity, and providing an incoming call reminder in a preset reminding mode to a user of the terminal according to the call reminder information.

In this technical solution, after the mobility management entity sends the SETUP information to the terminal, the terminal identifies the SETUP information, and the voice call setup procedure is started. Specifically, the terminal identifies the SETUP information and then send a call-confirmed message (SETUP response) to the mobility management entity to be relayed to the mobile switching center; the mobile switching center sends an Alerting message (incoming call reminder) to the mobility management entity to be relayed to the terminal; and after the terminal receives the Alerting message, the terminal displays the calling number to the user for the user to decide whether or not to answer.

In the above-mentioned technical solution, preferably, the interaction unit is further for receiving voice fallback information sent by the mobility management entity when it is judged that the completion of the voice call setup procedure on the first communication network is not supported, and disconnecting the data service of the first communication network according to the voice fallback information, so as to carry out the voice call setup procedure on the second communication network.

In this technical solution, when the mobility management entity does not support to complete the voice call setup procedure on the first communication network, the first communication network is directly disconnected, and the voice call setup procedure is carried out on the second communication network, so as to ensure normal establishment of the voice service.

In the above-mentioned technical solution, preferably, the interaction unit is further for sending a rejection response to the mobility management entity when it is detected that a rejection button of the terminal is selected.

In this technical solution, when the user refuses to answer the call, a rejection response is sent to the mobility management entity to be relayed to the mobile switching center, so as to release the circuit resource already allocated to the voice call.

In the above-mentioned technical solution, preferably, the interaction unit is further for receiving voice fallback information sent by the mobility management entity when the circuit resource information is sent by the mobility management entity; or receiving voice fallback information sent by the mobility management entity when the answer response is received by the mobility management entity.

In this technical solution, the voice fallback information can be sent when the mobility management entity sends the circuit resource information so as to perform voice fallback right after the voice call setup procedure is completed; or, the voice fallback information can be sent when the answer response is received after the voice call setup procedure has been completed.

According to another aspect of the present disclosure, there is also provided a mobility management entity that comprises an interaction unit, for receiving a call request sent by a mobile switching center and sending the call request to a terminal, and receiving a call response sent by the terminal according to the call request, wherein, the call response comprises an identifier for indicating whether a voice call setup procedure can be completed on a first communication network; a judging unit, for judging whether the completion of the voice call setup procedure on the first communication network is supported by the mobility management entity according to the identifier in the call response; wherein, the interaction unit is further for sending the call response to the mobile switching center when it is judged that the completion of the voice call setup procedure on the first communication network is supported by the mobility management entity, in order for the mobile switching center to judge whether the completion of the voice call setup procedure on the first communication network is supported according to the identifier; receiving parameter information required to carry out the voice call setup procedure and circuit resource information of a second communication network required for establishing voice service corresponding to the call request sent by the mobile switching center when it is judged that the completion of the voice call setup procedure on the first communication network is supported, and sending the same to the terminal; receiving an answer response sent by the terminal, and sending the answer response to the mobile switching center.

In this technical solution, when data service is being carried out on the first communication network that only supports data service, if call request is received, a voice call setup procedure is carried out on the first communication network by carrying out negotiation between the terminal and the mobile switching center on the first communication network, and the incoming call information is displayed on the terminal for the user to know, so that the user can choose whether or not to answer the call. When the user selects the answer button, the data service of the first communication network is disconnected, and voice service is established on the second communication network that supports the voice service. As a result, it is only when the user answers the incoming call that the network falls back from the first communication network to the second communication network, and when the user does not answer the incoming call, the first communication network is not disconnected, so that the ongoing data service is not affected when the user does not answer the call. In the meantime, because the voice service is established directly by using the received circuit resource information, as the circuit resource is readily available, the fallback can be completed very quickly.

Wherein, the first communication network may be an LTE network, the second communication network may be a 2G or 3G network. As such, when the user of the terminal is conducting data service on the LTE network, if a call request from a mobility management entity is received, then a voice call setup procedure is carried out on the LTE network, so that, without disconnecting the data service of the LTE network, the incoming call information can be displayed on the terminal for the user to decide whether or not to answer the incoming call. When the user answers the call, the network falls back from the LTE network to the 2G or 3G network. When the user does not answer the call, voice fallback is not performed, so that the ongoing data service is not affected when the user does not answer the call, thereby improving user experience.

Specifically, when the mobility management entity received the call response with the identifier, i.e. an identifier bit, it will judge whether this identifier bit is supported, and when this identifier bit is judged as being supported, the mobility management entity will send the parameter information required for the voice call setup procedure to the terminal. The mobility management entity will also send the circuit resource information of another communication network required for establishing voice service corresponding to the call request, so as to prepare for establishing the voice service when the user later chooses to answer the call.

In the above-mentioned technical solution, preferably, the parameter information comprises system information, location update response information, routing area update response information, and/or SETUP information of an area where the second communication network is located.

In this technical solution, the parameter information includes but not limited to one or more of system information, location update response information, routing area update response information, and/or SETUP information of an area where the second communication network is located.

In the above-mentioned technical solution, preferably, the interaction unit is further for sending the system information to the terminal after receiving the system information sent by the mobile switching center, in order for the terminal to send a location update request and a routing area update request to the mobility management entity according to the system information; receiving the location update request and the routing area update request, and sending the location update request and the routing area update request to the mobile switching center; receiving the location update response information and the routing area update response information sent by the mobile switching center in accordance with the location update request and the routing area update request, and sending the location update response information and the routing area update response information to the terminal.

In this technical solution, if location update and routing area update needs to be completed by the mobile switching center and the terminal, the OTA messages required to carry out these two procedures are also encapsulated by the mobility management entity and relayed between the terminal and the mobile switching center.

In the above-mentioned technical solution, preferably, the interaction unit is further for receiving the SETUP information sent by the mobile switching center, and sending the SETUP information to the terminal; receiving a SETUP response sent by the terminal according to the SETUP information, and sending the SETUP response to the mobile switching center; receiving call reminder information sent by the mobile switching center, and sending the call reminder information to the terminal; and receiving a rejection response sent by the terminal, and sending the rejection response to the mobile switching center.

In this technical solution, after the mobility management entity sends the SETUP information to the terminal, the terminal identifies the SETUP information, and the voice call setup procedure is started. Specifically, the terminal identifies the SETUP information and then send a call-confirmed message (SETUP response) to the mobility management entity to be relayed to the mobile switching center; the mobile switching center sends an Alerting message (incoming call reminder) to the mobility management entity to be relayed to the terminal; and after the terminal receives the Alerting message, the terminal displays the calling number to the user for the user to decide whether or not to answer. Wherein, if the user refuses to answer the call, a rejection response is sent to the mobility management entity to be relayed to the mobile switching center, so as to release the circuit resource already allocated to the voice call.

In the above-mentioned technical solution, preferably, the interaction unit is further for receiving voice fallback information sent by the mobile switching center when the circuit resource information is sent by the mobile switching center, or receiving voice fallback information sent by the mobile switching center when the answer response is received by the mobile switching center; and sending the voice fallback information to the terminal.

In this technical solution, the voice fallback information can be sent when the mobility management entity sends the circuit resource information so as to perform voice fallback right after the voice call setup procedure is completed; or, the voice fallback information can be sent when the answer response is received after the voice call setup procedure has been completed.

According to another aspect of the present disclosure, there is also provided a mobile switching center that comprises an interaction unit, for sending a call request to a mobility management entity and receiving a call response corresponding to the call request sent by the mobility management entity, wherein, the call response comprises an identifier for indicating whether a voice call setup procedure can be completed on a first communication network; a judging unit, for judging whether the completion of the voice call setup procedure on the first communication network is supported by the mobile switching center according to the identifier in the call response; an allocating unit, for allocating circuit resource information of a second communication network required for establishing voice service to a target terminal corresponding to the call request when it is judged that the completion of the voice call setup procedure on the first communication network is supported by the mobile switching center; wherein, the interaction unit is further for sending parameter information required to carry out the voice call setup procedure and the circuit resource information to the mobility management entity; receiving an answer response sent by the mobility management entity, sending voice fallback information to the mobility management entity in order for the mobility management entity to send the voice fallback information to the target terminal in order for the target terminal to disconnect data service of the first communication network according to the voice fallback information and establish voice service of the second communication network by using the received circuit resource information.

In this technical solution, when data service is being carried out on the first communication network that only supports data service, if call request is received, a voice call setup procedure is carried out on the first communication network by carrying out negotiation between the terminal and the mobile switching center on the first communication network, and the incoming call information is displayed on the terminal for the user to know, so that the user can choose whether or not to answer the call. When the user selects the answer button, the data service of the first communication network is disconnected, and voice service is established on the second communication network that supports the voice service. As a result, it is only when the user answers the incoming call that the network falls back from the first communication network to the second communication network, and when the user does not answer the incoming call, the first communication network is not disconnected, so that the ongoing data service is not affected when the user does not answer the call. In the meantime, because the voice service is established directly by using the received circuit resource information, as the circuit resource is readily available, the fallback can be completed very quickly.

Wherein, the first communication network may be an LTE network, the second communication network may be a 2G or 3G network. As such, when the user of the terminal is conducting data service on the LTE network, if a call request from a mobility management entity is received, then a voice call setup procedure is carried out on the LTE network, so that, without disconnecting the data service of the LTE network, the incoming call information can be displayed on the terminal for the user to decide whether or not to answer the incoming call. When the user answers the call, the network falls back from the LTE network to the 2G or 3G network. When the user does not answer the call, voice fallback is not performed, so that the ongoing data service is not affected when the user does not answer the call, thereby improving user experience.

Specifically, when the mobility management entity received the call response with the identifier, i.e. an identifier bit, it will judge whether this identifier bit is supported, and when this identifier bit is judged as being supported, the mobility management entity will send the parameter information required for the voice call setup procedure to the terminal. The mobility management entity will also send the circuit resource information of another communication network required for establishing voice service corresponding to the call request, so as to prepare for establishing the voice service when the user later chooses to answer the call.

In the above-mentioned technical solution, preferably, the parameter information comprises system information, location update response information, routing area update response information, and/or SETUP information of an area where the second communication network is located.

In this technical solution, the parameter information includes but not limited to one or more of system information, location update response information, routing area update response information, and/or SETUP information of an area where the second communication network is located.

In the above-mentioned technical solution, preferably, the interaction unit is further for sending the system information to the mobility management entity; receiving a location update request and a routing area update request sent by the mobility management entity; receiving the location update request and the routing area update request; sending the location update response information and the routing area update response information to the mobility management entity in accordance with the location update request and the routing area update request.

In this technical solution, if location update and routing area update needs to be completed by the mobile switching center and the terminal, the OTA messages required to carry out these two procedures are also encapsulated by the mobility management entity and relayed between the terminal and the mobile switching center.

In the above-mentioned technical solution, preferably, the interaction unit is further for sending the SETUP information to the mobility management entity, receiving a SETUP response sent by the mobility management entity, and sending call reminder information to the mobility management entity according to the SETUP response; receiving a rejection response sent by the mobility management entity, and releasing the allocated circuit resource according to the rejection response.

In this technical solution, after the mobility management entity sends the SETUP information to the terminal, the terminal identifies the SETUP information, and the voice call setup procedure is started. Specifically, the terminal identifies the SETUP information and then send a call-confirmed message (SETUP response) to the mobility management entity to be relayed to the mobile switching center; the mobile switching center sends an Alerting message (incoming call reminder) to the mobility management entity to be relayed to the terminal; and after the terminal receives the Alerting message, the terminal displays the calling number to the user for the user to decide whether or not to answer. Wherein, if the user refuses to answer the call, a rejection response is sent to the mobility management entity to be relayed to the mobile switching center, so as to release the circuit resource already allocated to the voice call.

In the above-mentioned technical solution, preferably, the interaction unit is further for sending the voice fallback information to the mobility management entity when sending the circuit resource information; or sending the voice fallback information to the mobility management entity when the answer response is received.

In this technical solution, the voice fallback information can be sent when the mobility management entity sends the circuit resource information so as to perform voice fallback right after the voice call setup procedure is completed; or, the voice fallback information can be sent when the answer response is received after the voice call setup procedure has been completed.

According to another aspect of the present disclosure, there is also provided a service processing system that comprises a terminal of any one of the above-mentioned technical solutions; a mobility management entity of any one of the above-mentioned technical solutions; and a mobile switching center of any one of the above-mentioned technical solutions.

According to another aspect of the present disclosure, there is also provided a service processing method applicable to a terminal that has a first communication module, configured to correspond to a first communication network that only supports data service; and a second communication module, configured to correspond to a second communication network that at least supports voice service; the method comprises: carrying out a voice call setup procedure on the first communication network if a call request from a mobility management entity is received when data service is being carried out by using the first communication network; receiving circuit resource information of the second communication network required for establishing voice service corresponding to the call request sent by the mobility management entity; sending an answer response to the mobility management entity, disconnecting the data service of the first communication network according to voice fallback information received from the mobility management entity, and establishing voice service of the second communication network by using the received circuit resource information, if it is detected that an answer button of the terminal is selected after the voice call setup procedure is completed.

In this technical solution, when data service is being carried out on the first communication network that only supports data service, if call request is received, a voice call setup procedure is carried out on the first communication network by carrying out negotiation between the terminal and the mobile switching center on the first communication network, and the incoming call information is displayed on the terminal for the user to know, so that the user can choose whether or not to answer the call. When the user selects the answer button, the data service of the first communication network is disconnected, and voice service is established on the second communication network that supports the voice service. As a result, it is only when the user answers the incoming call that the network falls back from the first communication network to the second communication network, and when the user does not answer the incoming call, the first communication network is not disconnected, so that the ongoing data service is not affected when the user does not answer the call. In the meantime, because the voice service is established directly by using the received circuit resource information, as the circuit resource is readily available, the fallback can be completed very quickly.

Wherein, the first communication network may be an LTE network, the second communication network may be a 2G or 3G network. As such, when the user of the terminal is conducting data service on the LTE network, if a call request from a mobility management entity is received, then a voice call setup procedure is carried out on the LTE network, so that, without disconnecting the data service of the LTE network, the incoming call information can be displayed on the terminal for the user to decide whether or not to answer the incoming call. When the user answers the call, the network falls back from the LTE network to the 2G or 3G network. When the user does not answer the call, voice fallback is not performed, so that the ongoing data service is not affected when the user does not answer the call, thereby improving user experience.

In the above-mentioned technical solution, preferably, a call response comprises an identifier for indicating whether the voice call setup procedure can be completed on the first communication network, in order for the mobility management entity to judge whether the completion of the voice call setup procedure on the first communication network is supported according to the identifier.

In this technical solution, the call response comprises an identifier for indicating whether the voice call setup procedure can be completed on the first communication network, wherein the identifier may be an identifier bit.

In the above-mentioned technical solution, preferably, said carrying out a voice call setup procedure on the first communication network comprises receiving parameter information required to carry out the voice call setup procedure sent by the mobility management entity when it is judged that the completion of the voice call setup procedure on the first communication network is supported; carrying out the voice call setup procedure on the first communication network according to the parameter information.

In this technical solution, when the mobility management entity received the call response with the identifier, i.e. the identifier bit, it will judge whether this identifier bit is supported, and when this identifier bit is judged as being supported, the mobility management entity will send the parameter information required for the voice call setup procedure to the terminal. The mobility management entity will also send the circuit resource information of another communication network required for establishing voice service corresponding to the call request, so as to prepare for establishing the voice service when the user later chooses to answer the call.

In the above-mentioned technical solution, preferably, the parameter information comprises system information, location update response information, routing area update response information, and/or SETUP information of an area where the second communication network is located.

In this technical solution, the parameter information includes but not limited to one or more of system information, location update response information, routing area update response information, and/or SETUP information of an area where the second communication network is located.

In the above-mentioned technical solution, the method further comprises: sending a location update request and a routing area update request to the mobility management entity after receiving the system information; and receiving the location update response information and the routing area update response information sent by the mobility management entity in accordance with the location update request and the routing area update request.

In this technical solution, if location update and routing area update needs to be completed by the mobile switching center and the terminal, the OTA messages required to carry out these two procedures are also encapsulated by the mobility management entity and relayed between the terminal and the mobile switching center.

In the above-mentioned technical solution, the voice call setup procedure comprises receiving the SETUP information sent by the mobility management entity, wherein, the SETUP information comprises identification information, encoding mode information, and frequency band resource information sent by another terminal that sends the call request; identifying the SETUP information for sending a SETUP response to the mobility management entity according to the identification result; and receiving call reminder information sent by the mobility management entity, and providing an incoming call reminder in a preset reminding mode to a user of the terminal according to the call reminder information.

In this technical solution, after the mobility management entity sends the SETUP information to the terminal, the terminal identifies the SETUP information, and the voice call setup procedure is started. Specifically, the terminal identifies the SETUP information and then send a call-confirmed message (SETUP response) to the mobility management entity to be relayed to the mobile switching center; the mobile switching center sends an Alerting message (incoming call reminder) to the mobility management entity to be relayed to the terminal; and after the terminal receives the Alerting message, the terminal displays the calling number to the user for the user to decide whether or not to answer.

In the above-mentioned technical solution, the method further comprises receiving voice fallback information sent by the mobility management entity when it is judged that the completion of the voice call setup procedure on the first communication network is not supported, and disconnecting the data service of the first communication network according to the voice fallback information, so as to carry out the voice call setup procedure on the second communication network.

In this technical solution, when the mobility management entity does not support to complete the voice call setup procedure on the first communication network, the first communication network is directly disconnected, and the voice call setup procedure is carried out on the second communication network, so as to ensure normal establishment of the voice service.

In the above-mentioned technical solution, the method further comprises sending a rejection response to the mobility management entity when it is detected that a rejection button of the terminal is selected.

In this technical solution, when the user refuses to answer the call, a rejection response is sent to the mobility management entity to be relayed to the mobile switching center, so as to release the circuit resource already allocated to the voice call.

In the above-mentioned technical solution, the method further comprises receiving voice fallback information sent by the mobility management entity when the circuit resource information is sent by the mobility management entity; or receiving voice fallback information sent by the mobility management entity when the answer response is received by the mobility management entity.

In this technical solution, the voice fallback information can be sent when the mobility management entity sends the circuit resource information so as to perform voice fallback right after the voice call setup procedure is completed; or, the voice fallback information can be sent when the answer response is received after the voice call setup procedure has been completed.

According to another aspect of the present disclosure, there is also provided a service processing method applicable to a mobility management entity, the method comprises: receiving a call request sent by a mobile switching center, and sending the call request to a terminal; receiving a call response sent by the terminal according to the call request, wherein, the call response comprises an identifier for indicating whether a voice call setup procedure can be completed on a first communication network; judging whether the completion of the voice call setup procedure on the first communication network is supported by the mobility management entity according to the identifier in the call response; sending the call response to the mobile switching center when it is judged that the completion of the voice call setup procedure on the first communication network is supported by the mobility management entity, in order for the mobile switching center to judge whether the completion of the voice call setup procedure on the first communication network is supported according to the identifier; receiving parameter information required to carry out the voice call setup procedure and circuit resource information of a second communication network required for establishing voice service corresponding to the call request sent by the mobile switching center when it is judged that the completion of the voice call setup procedure on the first communication network is supported, and sending the same to the terminal; receiving an answer response sent by the terminal, and sending the answer response to the mobile switching center.

In this technical solution, when data service is being carried out on the first communication network that only supports data service, if call request is received, a voice call setup procedure is carried out on the first communication network by carrying out negotiation between the terminal and the mobile switching center on the first communication network, and the incoming call information is displayed on the terminal for the user to know, so that the user can choose whether or not to answer the call. When the user selects the answer button, the data service of the first communication network is disconnected, and voice service is established on the second communication network that supports the voice service. As a result, it is only when the user answers the incoming call that the network falls back from the first communication network to the second communication network, and when the user does not answer the incoming call, the first communication network is not disconnected, so that the ongoing data service is not affected when the user does not answer the call. In the meantime, because the voice service is established directly by using the received circuit resource information, as the circuit resource is readily available, the fallback can be completed very quickly.

Wherein, the first communication network may be an LTE network, the second communication network may be a 2G or 3G network. As such, when the user of the terminal is conducting data service on the LTE network, if a call request from a mobility management entity is received, then a voice call setup procedure is carried out on the LTE network, so that, without disconnecting the data service of the LTE network, the incoming call information can be displayed on the terminal for the user to decide whether or not to answer the incoming call. When the user answers the call, the network falls back from the LTE network to the 2G or 3G network. When the user does not answer the call, voice fallback is not performed, so that the ongoing data service is not affected when the user does not answer the call, thereby improving user experience.

Specifically, when the mobility management entity received the call response with the identifier, i.e. an identifier bit, it will judge whether this identifier bit is supported, and when this identifier bit is judged as being supported, the mobility management entity will send the parameter information required for the voice call setup procedure to the terminal. The mobility management entity will also send the circuit resource information of another communication network required for establishing voice service corresponding to the call request, so as to prepare for establishing the voice service when the user later chooses to answer the call.

In the above-mentioned technical solution, preferably, the parameter information comprises system information, location update response information, routing area update response information, and/or SETUP information of an area where the second communication network is located, wherein, the second communication network is required to be switched to in order to carry out the voice service corresponding to the voice call setup procedure.

In this technical solution, the parameter information includes but not limited to one or more of system information, location update response information, routing area update response information, and/or SETUP information of an area where the second communication network is located.

In the above-mentioned technical solution, preferably, the method further comprises sending the system information to the terminal after receiving the system information sent by the mobile switching center, in order for the terminal to send a location update request and a routing area update request to the mobility management entity according to the system information; receiving the location update request and the routing area update request, and sending the location update request and the routing area update request to the mobile switching center; receiving the location update response information and the routing area update response information sent by the mobile switching center in accordance with the location update request and the routing area update request, and sending the location update response information and the routing area update response information to the terminal.

In this technical solution, if location update and routing area update needs to be completed by the mobile switching center and the terminal, the OTA messages required to carry out these two procedures are also encapsulated by the mobility management entity and relayed between the terminal and the mobile switching center.

In the above-mentioned technical solution, preferably, the method further comprises receiving the SETUP information sent by the mobile switching center, and sending the SETUP information to the terminal; receiving a SETUP response sent by the terminal according to the SETUP information, and sending the SETUP response to the mobile switching center; receiving call reminder information sent by the mobile switching center, and sending the call reminder information to the terminal; receiving a rejection response sent by the terminal, and sending the rejection response to the mobile switching center.

In this technical solution, after the mobility management entity sends the SETUP information to the terminal, the terminal identifies the SETUP information, and the voice call setup procedure is started. Specifically, the terminal identifies the SETUP information and then send a call-confirmed message (SETUP response) to the mobility management entity to be relayed to the mobile switching center; the mobile switching center sends an Alerting message (incoming call reminder) to the mobility management entity to be relayed to the terminal; and after the terminal receives the Alerting message, the terminal displays the calling number to the user for the user to decide whether or not to answer. Wherein, if the user refuses to answer the call, a rejection response is sent to the mobility management entity to be relayed to the mobile switching center, so as to release the circuit resource already allocated to the voice call.

In the above-mentioned technical solution, preferably, the method further comprises receiving voice fallback information sent by the mobile switching center when the circuit resource information is sent by the mobile switching center, or receiving voice fallback information sent by the mobile switching center when the answer response is received by the mobile switching center; and sending the voice fallback information to the terminal.

In this technical solution, the voice fallback information can be sent when the mobility management entity sends the circuit resource information so as to perform voice fallback right after the voice call setup procedure is completed; or, the voice fallback information can be sent when the answer response is received after the voice call setup procedure has been completed.

According to another aspect of the present disclosure, there is also provided a service processing method applicable to a mobile switching center, the method comprises: sending a call request to a mobility management entity and receiving a call response corresponding to the call request sent by the mobility management entity, wherein, the call response comprises an identifier for indicating whether a voice call setup procedure can be completed on a first communication network; judging whether the completion of the voice call setup procedure on the first communication network is supported by the mobile switching center according to the identifier in the call response; allocating circuit resource information of a second communication network required for establishing voice service to a target terminal corresponding to the call request when it is judged that the completion of the voice call setup procedure on the first communication network is supported by the mobile switching center; sending parameter information required to carry out the voice call setup procedure and the circuit resource information to the mobility management entity; receiving an answer response sent by the mobility management entity, sending voice fallback information to the mobility management entity in order for the mobility management entity to send the voice fallback information to the target terminal in order for the target terminal to disconnect data service of the first communication network according to the voice fallback information and establish voice service of the second communication network by using the received circuit resource information.

In this technical solution, when data service is being carried out on the first communication network that only supports data service, if call request is received, a voice call setup procedure is carried out on the first communication network by carrying out negotiation between the terminal and the mobile switching center on the first communication network, and the incoming call information is displayed on the terminal for the user to know, so that the user can choose whether or not to answer the call. When the user selects the answer button, the data service of the first communication network is disconnected, and voice service is established on the second communication network that supports the voice service. As a result, it is only when the user answers the incoming call that the network falls back from the first communication network to the second communication network, and when the user does not answer the incoming call, the first communication network is not disconnected, so that the ongoing data service is not affected when the user does not answer the call. In the meantime, because the voice service is established directly by using the received circuit resource information, as the circuit resource is readily available, the fallback can be completed very quickly.

Wherein, the first communication network may be an LTE network, the second communication network may be a 2G or 3G network. As such, when the user of the terminal is conducting data service on the LTE network, if a call request from a mobility management entity is received, then a voice call setup procedure is carried out on the LTE network, so that, without disconnecting the data service of the LTE network, the incoming call information can be displayed on the terminal for the user to decide whether or not to answer the incoming call. When the user answers the call, the network falls back from the LTE network to the 2G or 3G network. When the user does not answer the call, voice fallback is not performed, so that the ongoing data service is not affected when the user does not answer the call, thereby improving user experience.

Specifically, when the mobility management entity received the call response with the identifier, i.e. an identifier bit, it will judge whether this identifier bit is supported, and when this identifier bit is judged as being supported, the mobility management entity will send the parameter information required for the voice call setup procedure to the terminal. The mobility management entity will also send the circuit resource information of another communication network required for establishing voice service corresponding to the call request, so as to prepare for establishing the voice service when the user later chooses to answer the call.

In the above-mentioned technical solution, preferably, the parameter information comprises system information, location update response information, routing area update response information, and/or SETUP information of an area where the second communication network is located.

In this technical solution, the parameter information includes but not limited to one or more of system information, location update response information, routing area update response information, and/or SETUP information of an area where the second communication network is located.

In the above-mentioned technical solution, preferably, the method further comprises sending the system information to the mobility management entity; receiving a location update request and a routing area update request sent by the mobility management entity; receiving the location update request and the routing area update request; sending the location update response information and the routing area update response information to the mobility management entity in accordance with the location update request and the routing area update request.

In this technical solution, if location update and routing area update needs to be completed by the mobile switching center and the terminal, the OTA messages required to carry out these two procedures are also encapsulated by the mobility management entity and relayed between the terminal and the mobile switching center.

In the above-mentioned technical solution, preferably, the method further comprises sending the SETUP information to the mobility management entity, receiving a SETUP response sent by the mobility management entity, and sending call reminder information to the mobility management entity according to the SETUP response; receiving a rejection response sent by the mobility management entity, and release the allocated circuit resource according to the rejection response.

In this technical solution, after the mobility management entity sends the SETUP information to the terminal, the terminal identifies the SETUP information, and the voice call setup procedure is started. Specifically, the terminal identifies the SETUP information and then send a call-confirmed message (SETUP response) to the mobility management entity to be relayed to the mobile switching center; the mobile switching center sends an Alerting message (incoming call reminder) to the mobility management entity to be relayed to the terminal; and after the terminal receives the Alerting message, the terminal displays the calling number to the user for the user to decide whether or not to answer. Wherein, if the user refuses to answer the call, a rejection response is sent to the mobility management entity to be relayed to the mobile switching center, so as to release the circuit resource already allocated to the voice call.

In the above-mentioned technical solution, preferably, the method further comprises sending the voice fallback information to the mobility management entity when sending the circuit resource information; or sending the voice fallback information to the mobility management entity when the answer response is received.

According to another aspect of the present disclosure, there is also provided an electronic device comprising a first communication network module and a second communication network module, the first communication network module being corresponding to a first communication network that only supports data service, the second communication network module being corresponding to a second communication network that at least supports voice service, wherein, the electronic device comprises a processor and a memory communicably connected with the processor for storing program codes executable by the processor, wherein, execution of the program codes by the processor causes the processor to carry out a voice call setup procedure on the first communication network if a call request from a mobility management entity is received when data service is being carried out by using the first communication network; receive circuit resource information of the second communication network required for establishing voice service corresponding to the call request sent by the mobility management entity; send an answer response to the mobility management entity, disconnect the data service of the first communication network according to voice fallback information received from the mobility management entity, and establish voice service of the second communication network by using the received circuit resource information, if it is detected that an answer button of the terminal is selected after the voice call setup procedure is completed.

Preferably, the processor is further caused to send a call response to the mobility management entity when the call request is received, wherein, the call response includes an identifier for indicating whether the voice call setup procedure can be completed on the first communication network, in order for the mobility management entity to judge whether the completion of the voice call setup procedure on the first communication network is supported according to the identifier.

According to another aspect of the present disclosure, there is also provided an electronic device comprising a processor and a memory communicably connected with the processor for storing program codes executable by the processor, wherein, execution of the program codes by the processor causes the processor to receive a call request sent by a mobile switching center, and send the call request to a terminal; receive a call response sent by the terminal according to the call request, wherein, the call response includes an identifier for indicating whether a voice call setup procedure can be completed on a first communication network; judge whether the completion of the voice call setup procedure on the first communication network is supported by the mobility management entity according to the identifier in the call response; send the call response to the mobile switching center when it is judged that the completion of the voice call setup procedure on the first communication network is supported by the mobility management entity, in order for the mobile switching center to judge whether the completion of the voice call setup procedure on the first communication network is supported according to the identifier; receive parameter information required to carry out the voice call setup procedure as well as circuit resource information of a second communication network required for establishing voice service corresponding to the call request sent by the mobile switching center when it is judged that the completion of the voice call setup procedure on the first communication network is supported, and send the same to the terminal; receive an answer response sent by the terminal, and send the answer response to the mobile switching center.

Preferably, the parameter information includes system information, location update response information, routing area update response information, and/or SETUP information of an area where the second communication network is located, the second communication network being required to be switched to in order to carry out the voice service corresponding to the voice call setup procedure, and the processor is further caused to send the system information to the terminal after receiving the system information sent by the mobile switching center, in order for the terminal to send a location update request and a routing area update request to the mobility management entity according to the system information; receive the location update request and the routing area update request, and send the location update request and the routing area update request to the mobile switching center; receive the location update response information and the routing area update response information sent by the mobile switching center in accordance with the location update request and the routing area update request, and send the location update response information and the routing area update response information to the terminal.

According to another aspect of the present disclosure, there is also provided an electronic device comprising a processor and a memory communicably connected with the processor for storing program codes executable by the processor, wherein, execution of the program codes by the processor causes the processor to send a call request to a mobility management entity and receive a call response corresponding to the call request sent by the mobility management entity, wherein, the call response includes an identifier for indicating whether a voice call setup procedure can be completed on a first communication network; judge whether the completion of the voice call setup procedure on the first communication network is supported by the mobile switching center according to the identifier in the call response; allocate circuit resource information of a second communication network required for establishing voice service to a target terminal corresponding to the call request when it is judged that the completion of the voice call setup procedure on the first communication network is supported by the mobile switching center; send parameter information required to carry out the voice call setup procedure as well as the circuit resource information to the mobility management entity; receive an answer response sent by the mobility management entity, send voice fallback information to the mobility management entity in order for the mobility management entity to send the voice fallback information to the target terminal in order for the target terminal to disconnect data service of the first communication network according to the voice fallback information and establish voice service of the second communication network by using the received circuit resource information.

By means of the above-mentioned technical solutions, a tunnel for the OTA messages of the 2G or 3G network is provided through the LTE network, in order for the terminal to carry out a setup procedure for a voice call, so that the calling number can be known by the user and the user can decide whether or not to answer. In the situation of not answering, the data service on LTE would not be affected; if the user decides to answer, the user can do certain operation and safely exit the LTE data service.

DETAILED DESCRIPTION OF EMBODIMENTS

In order for the above-mentioned objectives, features and advantages of the present disclosure to be more clearly understood, hereinafter, detailed description of the present disclosure is further provided in combination with the accompanying drawings and specific embodiments. It needs to be noted that, as long as there is no conflict, the embodiments of the present disclosure as well as individual features in the embodiments can be combined with one another.

A lot of specific details are described hereinafter in order for the present disclosure to be fully understood, however, the present disclosure may also be implemented in other ways different from those described herein. Therefore, the protection scope of the present disclosure is not limited to the specific embodiments disclosed hereinafter.

Figure 1:
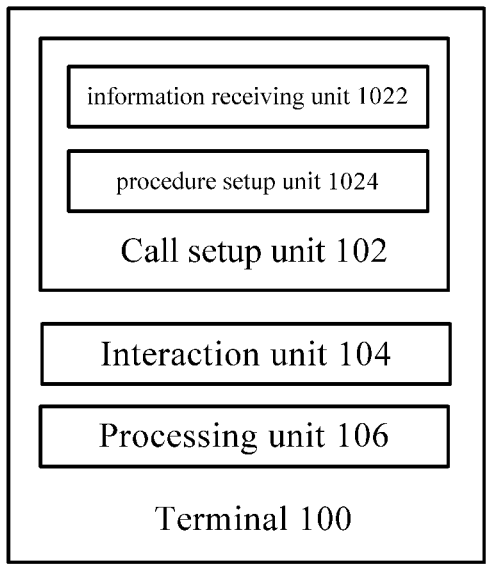
FIG. 1 shows a block diagram of a terminal in accordance with embodiments of the present disclosure.

FIG. 1 shows a block diagram of a terminal in accordance with embodiments of the present disclosure.

As shown in FIG. 1, the present disclosure provides a terminal 100 that comprises a first communication network module, configured to correspond to a first communication network that only supports data service; and a second communication network module, configured to correspond to a second communication network that at least supports voice service; wherein, the terminal further comprises a call setup unit 102, for carrying out a voice call setup procedure on the first communication network if a call request from a mobility management entity is received when data service is being carried out by using the first communication network; an interaction unit 104, for receiving circuit resource information of the second communication network required for establishing voice service corresponding to the call request sent by the mobility management entity; a processing unit 106, for sending an answer response to the mobility management entity, disconnecting the data service of the first communication network according to voice fallback information received from the mobility management entity, and establishing voice service of the second communication network by using the received circuit resource information, if it is detected that an answer button of the terminal is selected after the voice call setup procedure is completed.

In this technical solution, when data service is being carried out on the first communication network that only supports data service, if call request is received, a voice call setup procedure is carried out on the first communication network by carrying out negotiation between the terminal and the mobile switching center on the first communication network, and the incoming call information is displayed on the terminal for the user to know, so that the user can choose whether or not to answer the call. When the user selects the answer button, the data service of the first communication network is disconnected, and voice service is established on the second communication network that supports the voice service. As a result, it is only when the user answers the incoming call that the network falls back from the first communication network to the second communication network, and when the user does not answer the incoming call, the first communication network is not disconnected, so that the ongoing data service is not affected when the user does not answer the call. In the meantime, because the voice service is established directly by using the received circuit resource information, as the circuit resource is readily available, the fallback can be completed very quickly.

Wherein, the first communication network may be an LTE network, the second communication network may be a 2G or 3G network. As such, when the user of the terminal is conducting data service on the LTE network, if a call request from a mobility management entity is received, then a voice call setup procedure is carried out on the LTE network, so that, without disconnecting the data service of the LTE network, the incoming call information can be displayed on the terminal for the user to decide whether or not to answer the incoming call. When the user answers the call, the network falls back from the LTE network to the 2G or 3G network. When the user does not answer the call, voice fallback is not performed, so that the ongoing data service is not affected when the user does not answer the call, thereby improving user experience.

In the above-mentioned technical solution, preferably, the interaction unit 104 is further for sending a call response to the mobility management entity when the call request is received, wherein, the call response comprises an identifier for indicating whether the voice call setup procedure can be completed on the first communication network, in order for the mobility management entity to judge whether the completion of the voice call setup procedure on the first communication network is supported according to the identifier.

In this technical solution, the call response comprises an identifier for indicating whether the voice call setup procedure can be completed on the first communication network, wherein the identifier may be an identifier bit.

In the above-mentioned technical solution, preferably, the call setup unit 102 comprises: an information receiving unit 1022, for receiving parameter information required to carry out the voice call setup procedure sent by the mobility management entity when it is judged that the completion of the voice call setup procedure on the first communication network is supported; a procedure setup unit 1024, for carrying out the voice call setup procedure on the first communication network according to the parameter information.

In this technical solution, when the mobility management entity received the call response with the identifier, i.e. the identifier bit, it will judge whether this identifier bit is supported, and when this identifier bit is judged as being supported, the mobility management entity will send the parameter information required for the voice call setup procedure to the terminal. The mobility management entity will also send the circuit resource information of another communication network required for establishing voice service corresponding to the call request, so as to prepare for establishing the voice service when the user later chooses to answer the call.

In the above-mentioned technical solution, preferably, the parameter information comprises system information, location update response information, routing area update response information, and/or SETUP information of an area where the second communication network is located.

In this technical solution, the parameter information includes but not limited to one or more of system information, location update response information, routing area update response information, and/or SETUP information of an area where the second communication network is located.

In the above-mentioned technical solution, preferably, the interaction unit 104 is further for sending a location update request and a routing area update request to the mobility management entity after receiving the system information, and receiving the location update response information and the routing area update response information sent by the mobility management entity in accordance with the location update request and the routing area update request.

In this technical solution, if location update and routing area update needs to be completed by the mobile switching center and the terminal, the OTA messages required to carry out these two procedures are also encapsulated by the mobility management entity and relayed between the terminal and the mobile switching center.

In the above-mentioned technical solution, preferably, the voice call setup procedure comprises receiving the SETUP information sent by the mobility management entity, wherein, the SETUP information comprises identification information, encoding mode information, and frequency band resource information sent by another terminal that sends the call request; identifying the SETUP information for sending a SETUP response to the mobility management entity according to the identification result; and receiving call reminder information sent by the mobility management entity, and providing an incoming call reminder in a preset reminding mode to a user of the terminal according to the call reminder information.

In this technical solution, after the mobility management entity sends the SETUP information to the terminal, the terminal identifies the SETUP information, and the voice call setup procedure is started. Specifically, the terminal identifies the SETUP information and then send a call-confirmed message (SETUP response) to the mobility management entity to be relayed to the mobile switching center; the mobile switching center sends an Alerting message (incoming call reminder) to the mobility management entity to be relayed to the terminal; and after the terminal receives the Alerting message, the terminal displays the calling number to the user for the user to decide whether or not to answer.

In the above-mentioned technical solution, preferably, the interaction unit 104 is further for receiving voice fallback information sent by the mobility management entity when it is judged that the completion of the voice call setup procedure on the first communication network is not supported, and disconnecting the data service of the first communication network according to the voice fallback information, so as to carry out the voice call setup procedure on the second communication network.

In this technical solution, when the mobility management entity does not support to complete the voice call setup procedure on the first communication network, the first communication network is directly disconnected, and the voice call setup procedure is carried out on the second communication network, so as to ensure normal establishment of the voice service.

In the above-mentioned technical solution, preferably, the interaction unit 104 is further for sending a rejection response to the mobility management entity when it is detected that a rejection button of the terminal is selected.

In this technical solution, when the user refuses to answer the call, a rejection response is sent to the mobility management entity to be relayed to the mobile switching center, so as to release the circuit resource already allocated to the voice call.

In the above-mentioned technical solution, preferably, the interaction unit 104 is further for receiving voice fallback information sent by the mobility management entity when the circuit resource information is sent by the mobility management entity; or receiving voice fallback information sent by the mobility management entity when the answer response is received by the mobility management entity.

In this technical solution, the voice fallback information can be sent when the mobility management entity sends the circuit resource information so as to perform voice fallback right after the voice call setup procedure is completed; or, the voice fallback information can be sent when the answer response is received after the voice call setup procedure has been completed.

Figure 2:
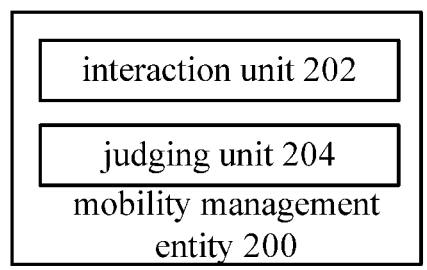
FIG. 2 shows a block diagram of a mobility management entity in accordance with embodiments of the present disclosure.

FIG. 2 shows a block diagram of a mobility management entity in accordance with embodiments of the present disclosure.

As shown in FIG. 2, the mobility management entity 200 in accordance with embodiments of the present disclosure comprises: an interaction unit 202, for receiving a call request sent by a mobile switching center and sending the call request to a terminal, and receiving a call response sent by the terminal according to the call request, wherein, the call response comprises an identifier for indicating whether a voice call setup procedure can be completed on a first communication network; a judging unit 204, for judging whether the completion of the voice call setup procedure on the first communication network is supported by the mobility management entity according to the identifier in the call response; wherein, the interaction unit 202 is further for sending the call response to the mobile switching center when it is judged that the completion of the voice call setup procedure on the first communication network is supported by the mobility management entity, in order for the mobile switching center to judge whether the completion of the voice call setup procedure on the first communication network is supported according to the identifier; receiving parameter information required to carry out the voice call setup procedure and circuit resource information of a second communication network required for establishing voice service corresponding to the call request sent by the mobile switching center when it is judged that the completion of the voice call setup procedure on the first communication network is supported, and sending the same to the terminal; receiving an answer response sent by the terminal, and sending the answer response to the mobile switching center.

In this technical solution, when data service is being carried out on the first communication network that only supports data service, if call request is received, a voice call setup procedure is carried out on the first communication network by carrying out negotiation between the terminal and the mobile switching center on the first communication network, and the incoming call information is displayed on the terminal for the user to know, so that the user can choose whether or not to answer the call. When the user selects the answer button, the data service of the first communication network is disconnected, and voice service is established on the second communication network that supports the voice service. As a result, it is only when the user answers the incoming call that the network falls back from the first communication network to the second communication network, and when the user does not answer the incoming call, the first communication network is not disconnected, so that the ongoing data service is not affected when the user does not answer the call. In the meantime, because the voice service is established directly by using the received circuit resource information, as the circuit resource is readily available, the fallback can be completed very quickly.

Wherein, the first communication network may be an LTE network, the second communication network may be a 2G or 3G network. As such, when the user of the terminal is conducting data service on the LTE network, if a call request from a mobility management entity is received, then a voice call setup procedure is carried out on the LTE network, so that, without disconnecting the data service of the LTE network, the incoming call information can be displayed on the terminal for the user to decide whether or not to answer the incoming call. When the user answers the call, the network falls back from the LTE network to the 2G or 3G network. When the user does not answer the call, voice fallback is not performed, so that the ongoing data service is not affected when the user does not answer the call, thereby improving user experience.

Specifically, when the mobility management entity received the call response with the identifier, i.e. an identifier bit, it will judge whether this identifier bit is supported, and when this identifier bit is judged as being supported, the mobility management entity will send the parameter information required for the voice call setup procedure to the terminal. The mobility management entity will also send the circuit resource information of another communication network required for establishing voice service corresponding to the call request, so as to prepare for establishing the voice service when the user later chooses to answer the call.

In the above-mentioned technical solution, preferably, the parameter information comprises system information, location update response information, routing area update response information, and/or SETUP information of an area where the second communication network is located.

In this technical solution, the parameter information includes but not limited to one or more of system information, location update response information, routing area update response information, and/or SETUP information of an area where the second communication network is located.

In the above-mentioned technical solution, preferably, the interaction unit 202 is further for sending the system information to the terminal after receiving the system information sent by the mobile switching center, in order for the terminal to send a location update request and a routing area update request to the mobility management entity according to the system information; receiving the location update request and the routing area update request, and sending the location update request and the routing area update request to the mobile switching center; receiving the location update response information and the routing area update response information sent by the mobile switching center in accordance with the location update request and the routing area update request, and sending the location update response information and the routing area update response information to the terminal.

In this technical solution, if location update and routing area update needs to be completed by the mobile switching center and the terminal, the OTA messages required to carry out these two procedures are also encapsulated by the mobility management entity and relayed between the terminal and the mobile switching center.

In the above-mentioned technical solution, preferably, the interaction unit 202 is further for receiving the SETUP information sent by the mobile switching center, and sending the SETUP information to the terminal; receiving a SETUP response sent by the terminal according to the SETUP information, and sending the SETUP response to the mobile switching center; receiving call reminder information sent by the mobile switching center, and sending the call reminder information to the terminal; and receiving a rejection response sent by the terminal, and sending the rejection response to the mobile switching center.

In this technical solution, after the mobility management entity sends the SETUP information to the terminal, the terminal identifies the SETUP information, and the voice call setup procedure is started. Specifically, the terminal identifies the SETUP information and then send a call-confirmed message (SETUP response) to the mobility management entity to be relayed to the mobile switching center; the mobile switching center sends an Alerting message (incoming call reminder) to the mobility management entity to be relayed to the terminal; and after the terminal receives the Alerting message, the terminal displays the calling number to the user for the user to decide whether or not to answer. Wherein, if the user refuses to answer the call, a rejection response is sent to the mobility management entity to be relayed to the mobile switching center, so as to release the circuit resource already allocated to the voice call.

In the above-mentioned technical solution, preferably, the interaction unit 202 is further for receiving voice fallback information sent by the mobile switching center when the circuit resource information is sent by the mobile switching center, or receiving voice fallback information sent by the mobile switching center when the answer response is received by the mobile switching center; and sending the voice fallback information to the terminal.

In this technical solution, the voice fallback information can be sent when the mobility management entity sends the circuit resource information so as to perform voice fallback right after the voice call setup procedure is completed; or, the voice fallback information can be sent when the answer response is received after the voice call setup procedure has been completed.

Figure 3:
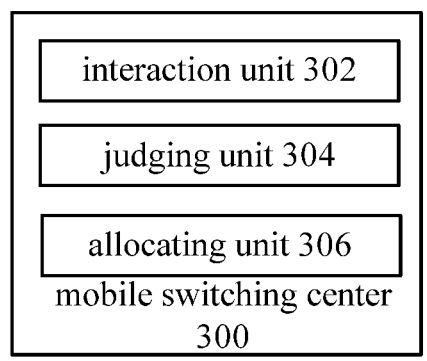
FIG. 3 shows a block diagram of a mobile switching center in accordance with embodiments of the present disclosure.

FIG. 3 shows a block diagram of a mobile switching center in accordance with embodiments of the present disclosure.

As shown in FIG. 3, according to another aspect of the present disclosure, there is also provided a mobile switching center 300 that comprises an interaction unit 302, for sending a call request to a mobility management entity and receiving a call response corresponding to the call request sent by the mobility management entity, wherein, the call response comprises an identifier for indicating whether a voice call setup procedure can be completed on a first communication network; a judging unit 304, for judging whether the completion of the voice call setup procedure on the first communication network is supported by the mobile switching center according to the identifier in the call response; an allocating unit 306, for allocating circuit resource information of a second communication network required for establishing voice service to a target terminal corresponding to the call request when it is judged that the completion of the voice call setup procedure on the first communication network is supported by the mobile switching center; wherein, the interaction unit is further for sending parameter information required to carry out the voice call setup procedure and the circuit resource information to the mobility management entity; receiving an answer response sent by the mobility management entity, sending voice fallback information to the mobility management entity in order for the mobility management entity to send the voice fallback information to the target terminal in order for the target terminal to disconnect data service of the first communication network according to the voice fallback information and establish voice service of the second communication network by using the received circuit resource information.

In this technical solution, when data service is being carried out on the first communication network that only supports data service, if call request is received, a voice call setup procedure is carried out on the first communication network by carrying out negotiation between the terminal and the mobile switching center on the first communication network, and the incoming call information is displayed on the terminal for the user to know, so that the user can choose whether or not to answer the call. When the user selects the answer button, the data service of the first communication network is disconnected, and voice service is established on the second communication network that supports the voice service. As a result, it is only when the user answers the incoming call that the network falls back from the first communication network to the second communication network, and when the user does not answer the incoming call, the first communication network is not disconnected, so that the ongoing data service is not affected when the user does not answer the call. In the meantime, because the voice service is established directly by using the received circuit resource information, as the circuit resource is readily available, the fallback can be completed very quickly.

Wherein, the first communication network may be an LTE network, the second communication network may be a 2G or 3G network. As such, when the user of the terminal is conducting data service on the LTE network, if a call request from a mobility management entity is received, then a voice call setup procedure is carried out on the LTE network, so that, without disconnecting the data service of the LTE network, the incoming call information can be displayed on the terminal for the user to decide whether or not to answer the incoming call. When the user answers the call, the network falls back from the LTE network to the 2G or 3G network. When the user does not answer the call, voice fallback is not performed, so that the ongoing data service is not affected when the user does not answer the call, thereby improving user experience.

Specifically, when the mobility management entity received the call response with the identifier, i.e. an identifier bit, it will judge whether this identifier bit is supported, and when this identifier bit is judged as being supported, the mobility management entity will send the parameter information required for the voice call setup procedure to the terminal. The mobility management entity will also send the circuit resource information of another communication network required for establishing voice service corresponding to the call request, so as to prepare for establishing the voice service when the user later chooses to answer the call.

In the above-mentioned technical solution, preferably, the parameter information comprises system information, location update response information, routing area update response information, and/or SETUP information of an area where the second communication network is located.

In this technical solution, the parameter information includes but not limited to one or more of system information, location update response information, routing area update response information, and/or SETUP information of an area where the second communication network is located.

In the above-mentioned technical solution, preferably, the interaction unit 302 is further for sending the system information to the mobility management entity; receiving a location update request and a routing area update request sent by the mobility management entity; receiving the location update request and the routing area update request; sending the location update response information and the routing area update response information to the mobility management entity in accordance with the location update request and the routing area update request.

In this technical solution, if location update and routing area update needs to be completed by the mobile switching center and the terminal, the OTA messages required to carry out these two procedures are also encapsulated by the mobility management entity and relayed between the terminal and the mobile switching center.

In the above-mentioned technical solution, preferably, the interaction unit 302 is further for sending the SETUP information to the mobility management entity, receiving a SETUP response sent by the mobility management entity, and sending call reminder information to the mobility management entity according to the SETUP response; receiving a rejection response sent by the mobility management entity, and releasing the allocated circuit resource according to the rejection response.

In this technical solution, after the mobility management entity sends the SETUP information to the terminal, the terminal identifies the SETUP information, and the voice call setup procedure is started. Specifically, the terminal identifies the SETUP information and then send a call-confirmed message (SETUP response) to the mobility management entity to be relayed to the mobile switching center; the mobile switching center sends an Alerting message (incoming call reminder) to the mobility management entity to be relayed to the terminal; and after the terminal receives the Alerting message, the terminal displays the calling number to the user for the user to decide whether or not to answer. Wherein, if the user refuses to answer the call, a rejection response is sent to the mobility management entity to be relayed to the mobile switching center, so as to release the circuit resource already allocated to the voice call.

In the above-mentioned technical solution, preferably, the interaction unit 302 is further for sending the voice fallback information to the mobility management entity when sending the circuit resource information; or sending the voice fallback information to the mobility management entity when the answer response is received.

In this technical solution, the voice fallback information can be sent when the mobility management entity sends the circuit resource information so as to perform voice fallback right after the voice call setup procedure is completed; or, the voice fallback information can be sent when the answer response is received after the voice call setup procedure has been completed.

Figure 4:
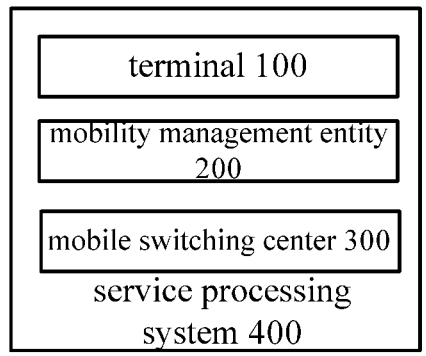
FIG. 4 shows a block diagram of a service processing system in accordance with embodiments of the present disclosure.

FIG. 4 shows a block diagram of a service processing system in accordance with embodiments of the present disclosure.

As shown in FIG. 4, the service processing system in accordance with embodiments of the present disclosure comprises a terminal 100 of any one of the above-mentioned technical solutions; a mobility management entity 200 of any one of the above-mentioned technical solutions; and a mobile switching center 300 of any one of the above-mentioned technical solutions.

Figure 5:
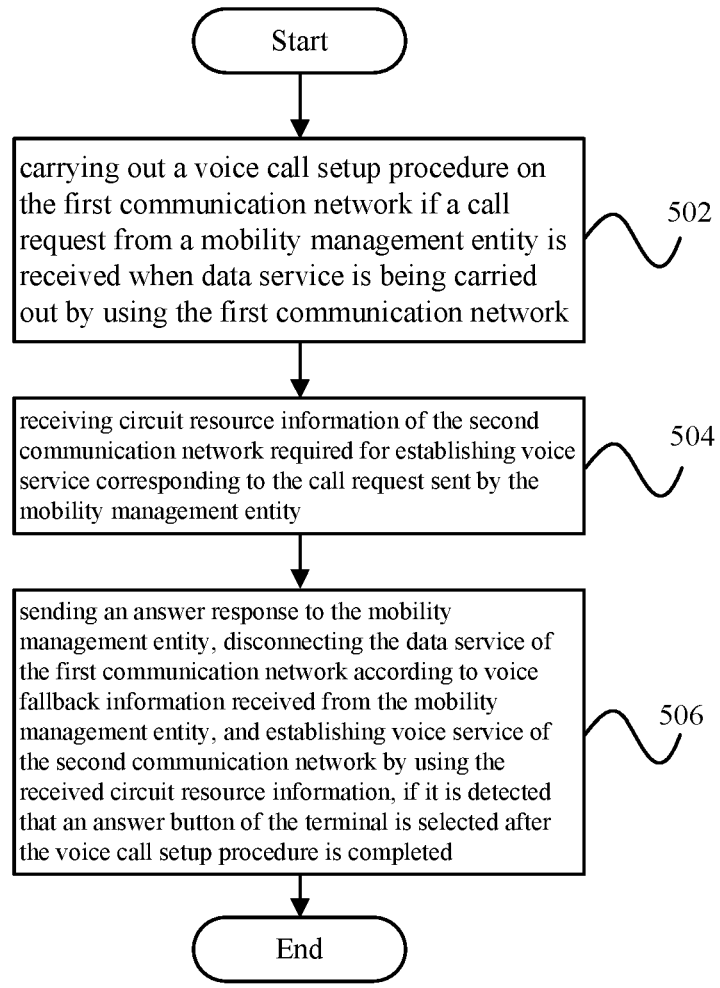
FIG. 5 shows a flow chart of a service processing method in accordance with an embodiment of the present disclosure.

FIG. 5 shows a flow chart of a service processing method in accordance with an embodiment of the present disclosure.

As shown in FIG. 5, the service processing method in accordance with an embodiment of the present disclosure, applicable to a terminal that has a first communication module, configured to correspond to a first communication network that only supports data service; and a second communication module, configured to correspond to a second communication network that at least supports voice service; the method comprises: Step 502, carrying out a voice call setup procedure on the first communication network if a call request from a mobility management entity is received when data service is being carried out by using the first communication network; Step 504, receiving circuit resource information of the second communication network required for establishing voice service corresponding to the call request sent by the mobility management entity; Step 506, sending an answer response to the mobility management entity, disconnecting the data service of the first communication network according to voice fallback information received from the mobility management entity, and establishing voice service of the second communication network by using the received circuit resource information, if it is detected that an answer button of the terminal is selected after the voice call setup procedure is completed.

In this technical solution, when data service is being carried out on the first communication network that only supports data service, if call request is received, a voice call setup procedure is carried out on the first communication network by carrying out negotiation between the terminal and the mobile switching center on the first communication network, and the incoming call information is displayed on the terminal for the user to know, so that the user can choose whether or not to answer the call. When the user selects the answer button, the data service of the first communication network is disconnected, and voice service is established on the second communication network that supports the voice service. As a result, it is only when the user answers the incoming call that the network falls back from the first communication network to the second communication network, and when the user does not answer the incoming call, the first communication network is not disconnected, so that the ongoing data service is not affected when the user does not answer the call. In the meantime, because the voice service is established directly by using the received circuit resource information, as the circuit resource is readily available, the fallback can be completed very quickly.

Wherein, the first communication network may be an LTE network, the second communication network may be a 2G or 3G network. As such, when the user of the terminal is conducting data service on the LTE network, if a call request from a mobility management entity is received, then a voice call setup procedure is carried out on the LTE network, so that, without disconnecting the data service of the LTE network, the incoming call information can be displayed on the terminal for the user to decide whether or not to answer the incoming call. When the user answers the call, the network falls back from the LTE network to the 2G or 3G network. When the user does not answer the call, voice fallback is not performed, so that the ongoing data service is not affected when the user does not answer the call, thereby improving user experience.

In the above-mentioned technical solution, preferably, a call response comprises an identifier for indicating whether the voice call setup procedure can be completed on the first communication network, in order for the mobility management entity to judge whether the completion of the voice call setup procedure on the first communication network is supported according to the identifier.

In this technical solution, the call response comprises an identifier for indicating whether the voice call setup procedure can be completed on the first communication network, wherein the identifier may be an identifier bit.

In the above-mentioned technical solution, preferably, said carrying out a voice call setup procedure on the first communication network comprises receiving parameter information required to carry out the voice call setup procedure sent by the mobility management entity when it is judged that the completion of the voice call setup procedure on the first communication network is supported; carrying out the voice call setup procedure on the first communication network according to the parameter information.

In this technical solution, when the mobility management entity received the call response with the identifier, i.e. the identifier bit, it will judge whether this identifier bit is supported, and when this identifier bit is judged as being supported, the mobility management entity will send the parameter information required for the voice call setup procedure to the terminal. The mobility management entity will also send the circuit resource information of another communication network required for establishing voice service corresponding to the call request, so as to prepare for establishing the voice service when the user later chooses to answer the call.

In the above-mentioned technical solution, preferably, the parameter information comprises system information, location update response information, routing area update response information, and/or SETUP information of an area where the second communication network is located.

In this technical solution, the parameter information includes but not limited to one or more of system information, location update response information, routing area update response information, and/or SETUP information of an area where the second communication network is located.

In the above-mentioned technical solution, the method further comprises: sending a location update request and a routing area update request to the mobility management entity after receiving the system information; and receiving the location update response information and the routing area update response information sent by the mobility management entity in accordance with the location update request and the routing area update request.

In this technical solution, if location update and routing area update needs to be completed by the mobile switching center and the terminal, the OTA messages required to carry out these two procedures are also encapsulated by the mobility management entity and relayed between the terminal and the mobile switching center.

In the above-mentioned technical solution, the voice call setup procedure comprises receiving the SETUP information sent by the mobility management entity, wherein the SETUP information comprises identification information, encoding mode information, and frequency band resource information sent by another terminal that sends the call request; identifying the SETUP information for sending a SETUP response to the mobility management entity according to the identification result; and receiving call reminder information sent by the mobility management entity, and providing an incoming call reminder in a preset reminding mode to a user of the terminal according to the call reminder information.

In this technical solution, after the mobility management entity sends the SETUP information to the terminal, the terminal identifies the SETUP information, and the voice call setup procedure is started. Specifically, the terminal identifies the SETUP information and then send a call-confirmed message (SETUP response) to the mobility management entity to be relayed to the mobile switching center; the mobile switching center sends an Alerting message (incoming call reminder) to the mobility management entity to be relayed to the terminal; and after the terminal receives the Alerting message, the terminal displays the calling number to the user for the user to decide whether or not to answer.

In the above-mentioned technical solution, the method further comprises receiving voice fallback information sent by the mobility management entity when it is judged that the completion of the voice call setup procedure on the first communication network is not supported, and disconnecting the data service of the first communication network according to the voice fallback information, so as to carry out the voice call setup procedure on the second communication network.

In this technical solution, when the mobility management entity does not support to complete the voice call setup procedure on the first communication network, the first communication network is directly disconnected, and the voice call setup procedure is carried out on the second communication network, so as to ensure normal establishment of the voice service.

In the above-mentioned technical solution, the method further comprises sending a rejection response to the mobility management entity when it is detected that a rejection button of the terminal is selected.

In this technical solution, when the user refuses to answer the call, a rejection response is sent to the mobility management entity to be relayed to the mobile switching center, so as to release the circuit resource already allocated to the voice call.

In the above-mentioned technical solution, the method further comprises receiving voice fallback information sent by the mobility management entity when the circuit resource information is sent by the mobility management entity; or receiving voice fallback information sent by the mobility management entity when the answer response is received by the mobility management entity.

In this technical solution, the voice fallback information can be sent when the mobility management entity sends the circuit resource information so as to perform voice fallback right after the voice call setup procedure is completed; or, the voice fallback information can be sent when the answer response is received after the voice call setup procedure has been completed.

Figure 6:
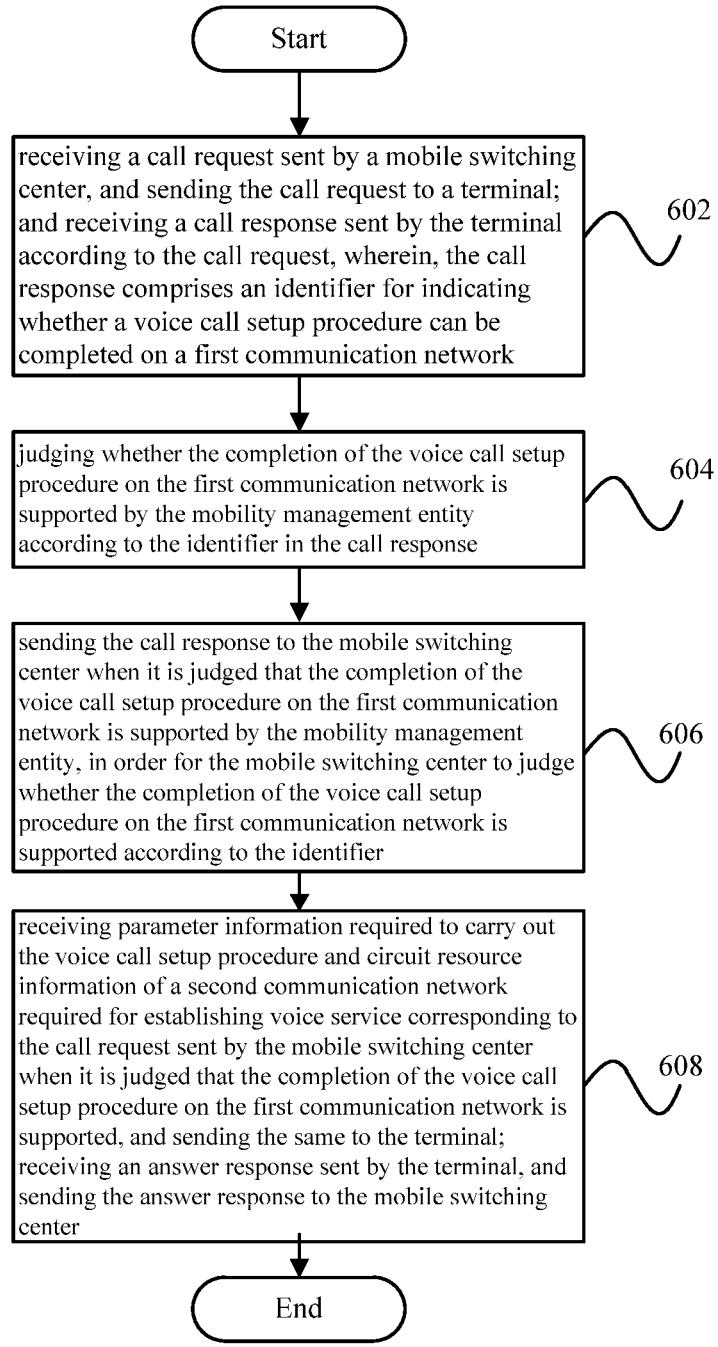
FIG. 6 shows a flow chart of a service processing method in accordance with another embodiment of the present disclosure.

FIG. 6 shows a flow chart of a service processing method in accordance with another embodiment of the present disclosure.

As shown in FIG. 6, the service processing method applicable to a mobility management entity in accordance with the embodiment of the present disclosure comprises: Step 602, receiving a call request sent by a mobile switching center, and sending the call request to a terminal; receiving a call response sent by the terminal according to the call request, wherein, the call response comprises an identifier for indicating whether a voice call setup procedure can be completed on a first communication network; Step 604, judging whether the completion of the voice call setup procedure on the first communication network is supported by the mobility management entity according to the identifier in the call response; Step 606, sending the call response to the mobile switching center when it is judged that the completion of the voice call setup procedure on the first communication network is supported by the mobility management entity, in order for the mobile switching center to judge whether the completion of the voice call setup procedure on the first communication network is supported according to the identifier; Step 608, receiving parameter information required to carry out the voice call setup procedure and circuit resource information of a second communication network required for establishing voice service corresponding to the call request sent by the mobile switching center when it is judged that the completion of the voice call setup procedure on the first communication network is supported, and sending the same to the terminal; receiving an answer response sent by the terminal, and sending the answer response to the mobile switching center.

In this technical solution, when data service is being carried out on the first communication network that only supports data service, if call request is received, a voice call setup procedure is carried out on the first communication network by carrying out negotiation between the terminal and the mobile switching center on the first communication network, and the incoming call information is displayed on the terminal for the user to know, so that the user can choose whether or not to answer the call. When the user selects the answer button, the data service of the first communication network is disconnected, and voice service is established on the second communication network that supports the voice service. As a result, it is only when the user answers the incoming call that the network falls back from the first communication network to the second communication network, and when the user does not answer the incoming call, the first communication network is not disconnected, so that the ongoing data service is not affected when the user does not answer the call. In the meantime, because the voice service is established directly by using the received circuit resource information, as the circuit resource is readily available, the fallback can be completed very quickly.

Wherein, the first communication network may be an LTE network, the second communication network may be a 2G or 3G network. As such, when the user of the terminal is conducting data service on the LTE network, if a call request from a mobility management entity is received, then a voice call setup procedure is carried out on the LTE network, so that, without disconnecting the data service of the LTE network, the incoming call information can be displayed on the terminal for the user to decide whether or not to answer the incoming call. When the user answers the call, the network falls back from the LTE network to the 2G or 3G network. When the user does not answer the call, voice fallback is not performed, so that the ongoing data service is not affected when the user does not answer the call, thereby improving user experience.

Specifically, when the mobility management entity received the call response with the identifier, i.e. an identifier bit, it will judge whether this identifier bit is supported, and when this identifier bit is judged as being supported, the mobility management entity will send the parameter information required for the voice call setup procedure to the terminal. The mobility management entity will also send the circuit resource information of another communication network required for establishing voice service corresponding to the call request, so as to prepare for establishing the voice service when the user later chooses to answer the call.

In the above-mentioned technical solution, preferably, the parameter information comprises system information, location update response information, routing area update response information, and/or SETUP information of an area where the second communication network is located, wherein, the second communication network is required to be switched to in order to carry out the voice service corresponding to the voice call setup procedure.

In this technical solution, the parameter information includes but not limited to one or more of system information, location update response information, routing area update response information, and/or SETUP information of an area where the second communication network is located.

In the above-mentioned technical solution, preferably, the method further comprises sending the system information to the terminal after receiving the system information sent by the mobile switching center, in order for the terminal to send a location update request and a routing area update request to the mobility management entity according to the system information; receiving the location update request and the routing area update request, and sending the location update request and the routing area update request to the mobile switching center; receiving the location update response information and the routing area update response information sent by the mobile switching center in accordance with the location update request and the routing area update request, and sending the location update response information and the routing area update response information to the terminal.

In this technical solution, if location update and routing area update needs to be completed by the mobile switching center and the terminal, the OTA messages required to carry out these two procedures are also encapsulated by the mobility management entity and relayed between the terminal and the mobile switching center.

In the above-mentioned technical solution, preferably, the method further comprises receiving the SETUP information sent by the mobile switching center, and sending the SETUP information to the terminal; receiving a SETUP response sent by the terminal according to the SETUP information, and sending the SETUP response to the mobile switching center; receiving call reminder information sent by the mobile switching center, and sending the call reminder information to the terminal; receiving a rejection response sent by the terminal, and sending the rejection response to the mobile switching center.

In this technical solution, after the mobility management entity sends the SETUP information to the terminal, the terminal identifies the SETUP information, and the voice call setup procedure is started. Specifically, the terminal identifies the SETUP information and then send a call-confirmed message (SETUP response) to the mobility management entity to be relayed to the mobile switching center; the mobile switching center sends an Alerting message (incoming call reminder) to the mobility management entity to be relayed to the terminal; and after the terminal receives the Alerting message, the terminal displays the calling number to the user for the user to decide whether or not to answer. Wherein, if the user refuses to answer the call, a rejection response is sent to the mobility management entity to be relayed to the mobile switching center, so as to release the circuit resource already allocated to the voice call.

In the above-mentioned technical solution, preferably, the method further comprises receiving voice fallback information sent by the mobile switching center when the circuit resource information is sent by the mobile switching center, or receiving voice fallback information sent by the mobile switching center when the answer response is received by the mobile switching center; and sending the voice fallback information to the terminal.

In this technical solution, the voice fallback information can be sent when the mobility management entity sends the circuit resource information so as to perform voice fallback right after the voice call setup procedure is completed; or, the voice fallback information can be sent when the answer response is received after the voice call setup procedure has been completed.

Figure 7:
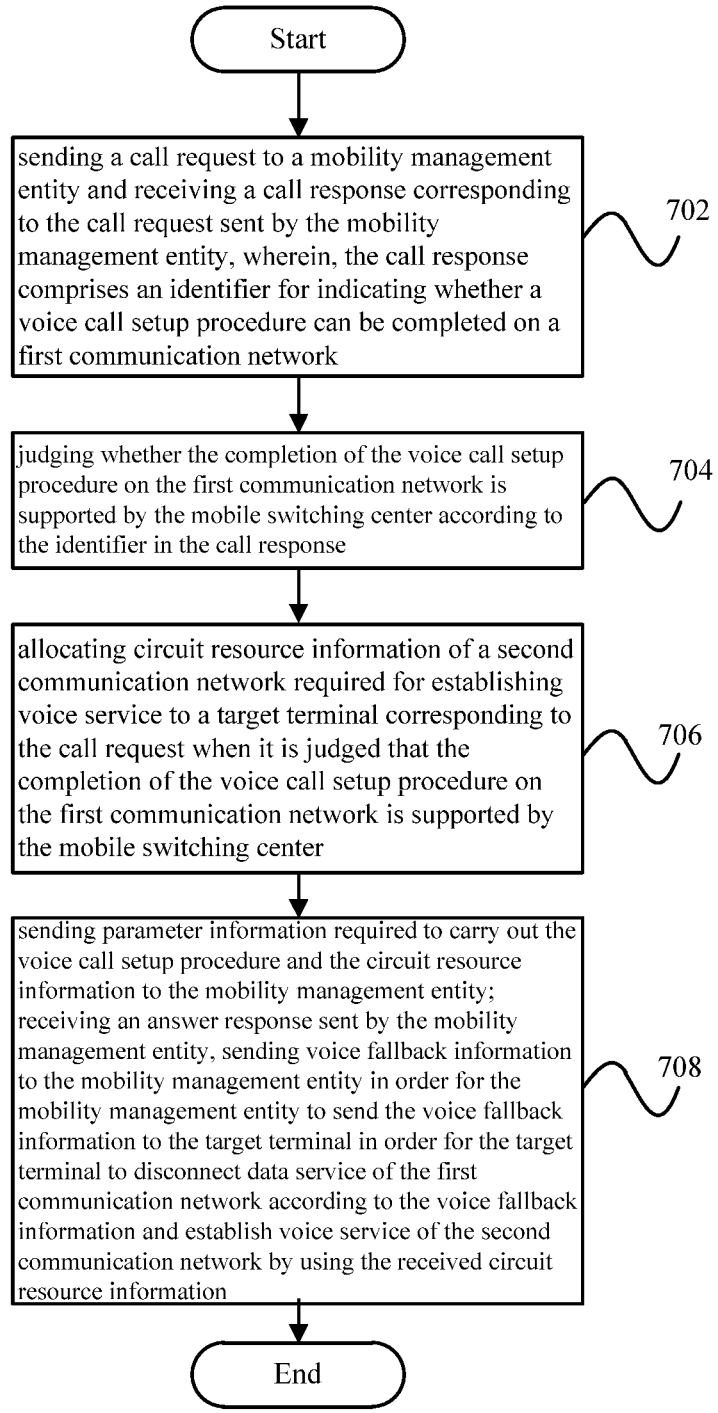
FIG. 7 shows a flow chart of a service processing method in accordance with yet another embodiment of the present disclosure.

FIG. 7 shows a flow chart of a service processing method in accordance with yet another embodiment of the present disclosure.

As shown in FIG. 7, the service processing method applicable to a mobile switching center in accordance with the embodiment of the present disclosure comprises: Step 702, sending a call request to a mobility management entity and receiving a call response corresponding to the call request sent by the mobility management entity, wherein, the call response comprises an identifier for indicating whether a voice call setup procedure can be completed on a first communication network; Step 704, judging whether the completion of the voice call setup procedure on the first communication network is supported by the mobile switching center according to the identifier in the call response; Step 706, allocating circuit resource information of a second communication network required for establishing voice service to a target terminal corresponding to the call request when it is judged that the completion of the voice call setup procedure on the first communication network is supported by the mobile switching center; Step 708, sending parameter information required to carry out the voice call setup procedure and the circuit resource information to the mobility management entity; receiving an answer response sent by the mobility management entity, sending voice fallback information to the mobility management entity in order for the mobility management entity to send the voice fallback information to the target terminal in order for the target terminal to disconnect data service of the first communication network according to the voice fallback information and establish voice service of the second communication network by using the received circuit resource information.

In this technical solution, when data service is being carried out on the first communication network that only supports data service, if call request is received, a voice call setup procedure is carried out on the first communication network by carrying out negotiation between the terminal and the mobile switching center on the first communication network, and the incoming call information is displayed on the terminal for the user to know, so that the user can choose whether or not to answer the call. When the user selects the answer button, the data service of the first communication network is disconnected, and voice service is established on the second communication network that supports the voice service. As a result, it is only when the user answers the incoming call that the network falls back from the first communication network to the second communication network, and when the user does not answer the incoming call, the first communication network is not disconnected, so that the ongoing data service is not affected when the user does not answer the call. In the meantime, because the voice service is established directly by using the received circuit resource information, as the circuit resource is readily available, the fallback can be completed very quickly.

Wherein, the first communication network may be an LTE network, the second communication network may be a 2G or 3G network. As such, when the user of the terminal is conducting data service on the LTE network, if a call request from a mobility management entity is received, then a voice call setup procedure is carried out on the LTE network, so that, without disconnecting the data service of the LTE network, the incoming call information can be displayed on the terminal for the user to decide whether or not to answer the incoming call. When the user answers the call, the network falls back from the LTE network to the 2G or 3G network. When the user does not answer the call, voice fallback is not performed, so that the ongoing data service is not affected when the user does not answer the call, thereby improving user experience.

Specifically, when the mobility management entity received the call response with the identifier, i.e. an identifier bit, it will judge whether this identifier bit is supported, and when this identifier bit is judged as being supported, the mobility management entity will send the parameter information required for the voice call setup procedure to the terminal. The mobility management entity will also send the circuit resource information of another communication network required for establishing voice service corresponding to the call request, so as to prepare for establishing the voice service when the user later chooses to answer the call.

In the above-mentioned technical solution, preferably, the parameter information comprises system information, location update response information, routing area update response information, and/or SETUP information of an area where the second communication network is located.

In this technical solution, the parameter information includes but not limited to one or more of system information, location update response information, routing area update response information, and/or SETUP information of an area where the second communication network is located.

In the above-mentioned technical solution, preferably, the method further comprises sending the system information to the mobility management entity; receiving a location update request and a routing area update request sent by the mobility management entity; receiving the location update request and the routing area update request; sending the location update response information and the routing area update response information to the mobility management entity in accordance with the location update request and the routing area update request.

In this technical solution, if location update and routing area update needs to be completed by the mobile switching center and the terminal, the OTA messages required to carry out these two procedures are also encapsulated by the mobility management entity and relayed between the terminal and the mobile switching center.

In the above-mentioned technical solution, preferably, the method further comprises sending the SETUP information to the mobility management entity, receiving a SETUP response sent by the mobility management entity, and sending call reminder information to the mobility management entity according to the SETUP response; receiving a rejection response sent by the mobility management entity, and release the allocated circuit resource according to the rejection response.

In this technical solution, after the mobility management entity sends the SETUP information to the terminal, the terminal identifies the SETUP information, and the voice call setup procedure is started. Specifically, the terminal identifies the SETUP information and then send a call-confirmed message (SETUP response) to the mobility management entity to be relayed to the mobile switching center; the mobile switching center sends an Alerting message (incoming call reminder) to the mobility management entity to be relayed to the terminal; and after the terminal receives the Alerting message, the terminal displays the calling number to the user for the user to decide whether or not to answer. Wherein, if the user refuses to answer the call, a rejection response is sent to the mobility management entity to be relayed to the mobile switching center, so as to release the circuit resource already allocated to the voice call.

In the above-mentioned technical solution, preferably, the method further comprises sending the voice fallback information to the mobility management entity when sending the circuit resource information; or sending the voice fallback information to the mobility management entity when the answer response is received.

By means of the above-mentioned technical solutions, a tunnel for the OTA messages of the 2G or 3G network is provided through the LTE network, in order for the terminal to carry out a setup procedure for a voice call, so that the calling number can be known by the user and the user can decide whether or not to answer. In the situation of not answering, the data service on LTE would not be affected; if the user decides to answer, the user can do certain operation and safely exit the LTE data service.

Figure 8:
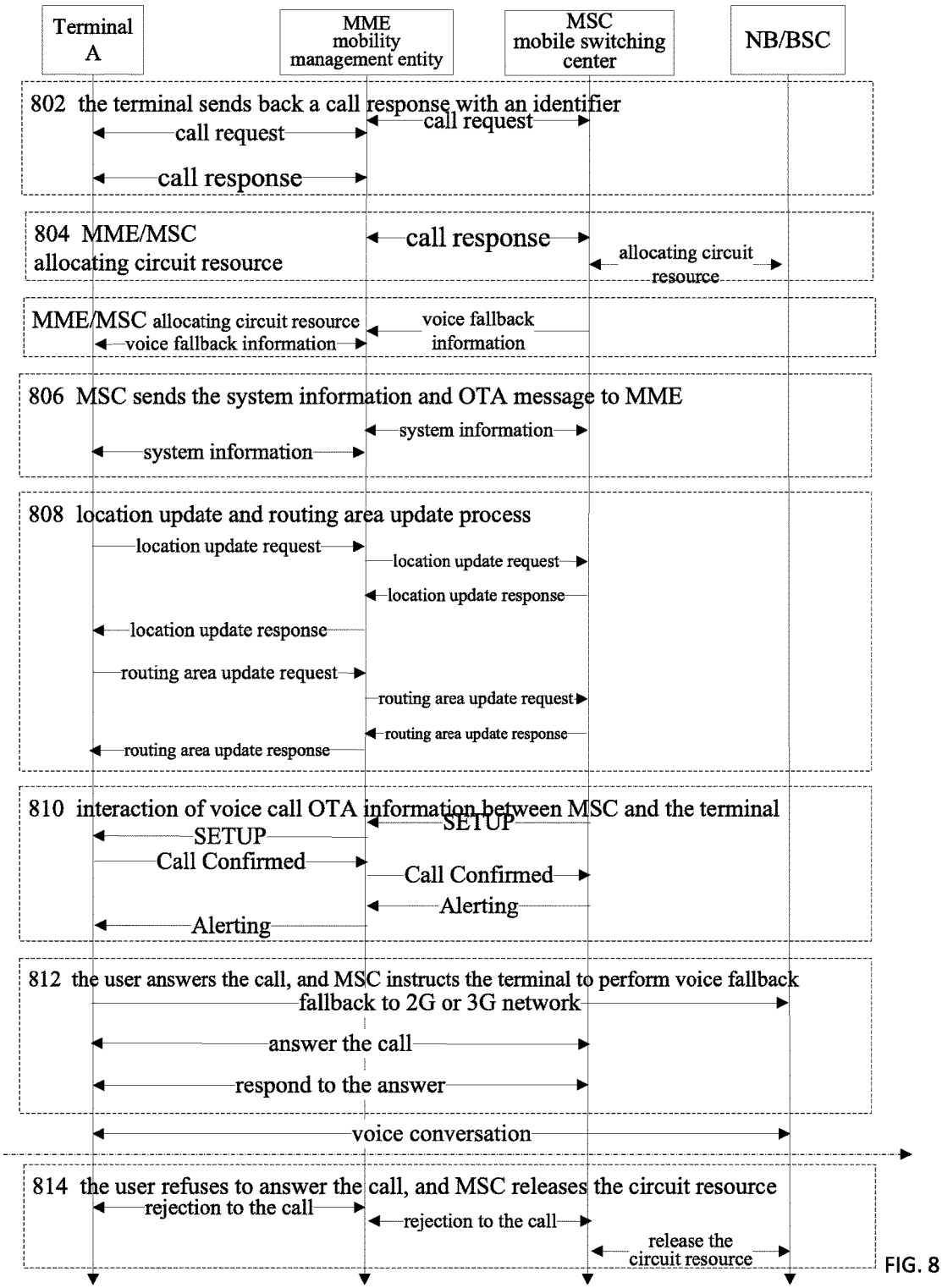
FIG. 8 shows a detailed flow chart of a service processing method in accordance with an embodiment of the present disclosure.

FIG. 8 shows a detailed flow chart of a service processing method in accordance with an embodiment of the present disclosure.

As shown in FIG. 8, the service processing method in accordance with the embodiment of the present disclosure has the following specific flow steps:

Step 802, the terminal sends back a call response with an identifier. After the terminal detects a Paging Request sent by the mobility management entity (MME) on LTE, it uses an identifier in the Extended Service Request sent back to the mobility management entity to indicate whether a voice call setup procedure can be completed on LTE.

Step 804, circuit resource is allocated. If the mobility management entity supports this identifier, a mobile switching center (MSC) of a 2G or 3G network is selected to allocate the circuit resource, and meanwhile the mobile switching center of the 2G or 3G network is notified to send voice fallback information, OTA messages for the voice call and necessary system information to the mobility management entity. If the mobility management entity does not support this identifier, the terminal is instructed to directly fall back to a 2G or 3G network according to the conventional CSFB way.

Step 806, the mobile switching center sends the system information and the OTA messages to the mobility management entity. The mobile switching center sends the system information of the area where the 2G or 3G network is located to the terminal through the mobility management entity.

Step 808, location update and routing area update are conducted. If Location Update process and Routing Area Update process are required to be conducted between the mobile switching center (MSC) and the terminal, the OTA messages required to conduct these two processes are also encapsulated by the mobility management entity and relayed between the terminal and the mobile switching center. Wherein, in the processes, the 2G or 3G network needs to notify NB or BSC to allocate and keep necessary circuit resources, even if the terminal has not yet used them.

Step 810, the OTA messages are exchanged between the mobile switching center (MSC) and the terminal. Specifically, the mobility management entity sends the encapsulated SETUP message to the called terminal, the called terminal identifies the message and then starts the voice call setup procedure. In the call setup procedure as well as in the previous Step 806 and Step 808, the terminal stays on the LTE network all along, and is not required to be switched to a 2G or 3G network. After the terminal identifies the SETUP message, the terminal sends a Call-Confirmed message to the mobility management entity to be relayed to the mobile switching center. Likewise, the mobile switching center sends an Alerting message to the mobility management entity to be encapsulated and relayed to the terminal.

Step 812, the user answers the call, and the mobile switching center instructs the terminal to perform voice fallback. After the terminal receives the SETUP message, the terminal displays the calling number to the user for the user to decide whether or not to answer. If the user decides to answer the call, the terminal sends an answer request to the mobility management entity to be relayed to the mobile switching center. After the mobile switching center receives the answer request, the mobile switching center sends a response-to-answer to the mobility management entity to be relayed to the terminal, so as to notify the terminal to perform voice fallback according the previously received voice fallback information. In accordance with the voice fallback information received during Step 804, the terminal falls back to the 2G or 3G network and starts the voice conversation. As the circuit resource of the 2G or 3G network is readily available, the fallback can be completed very quickly.

Step 814, if the user refuses to answer the call, the terminal sends a call-rejection request to the mobility management entity to be relayed to the mobile switching center, and then the mobile switching center releases the circuit resource.

Figure 9:
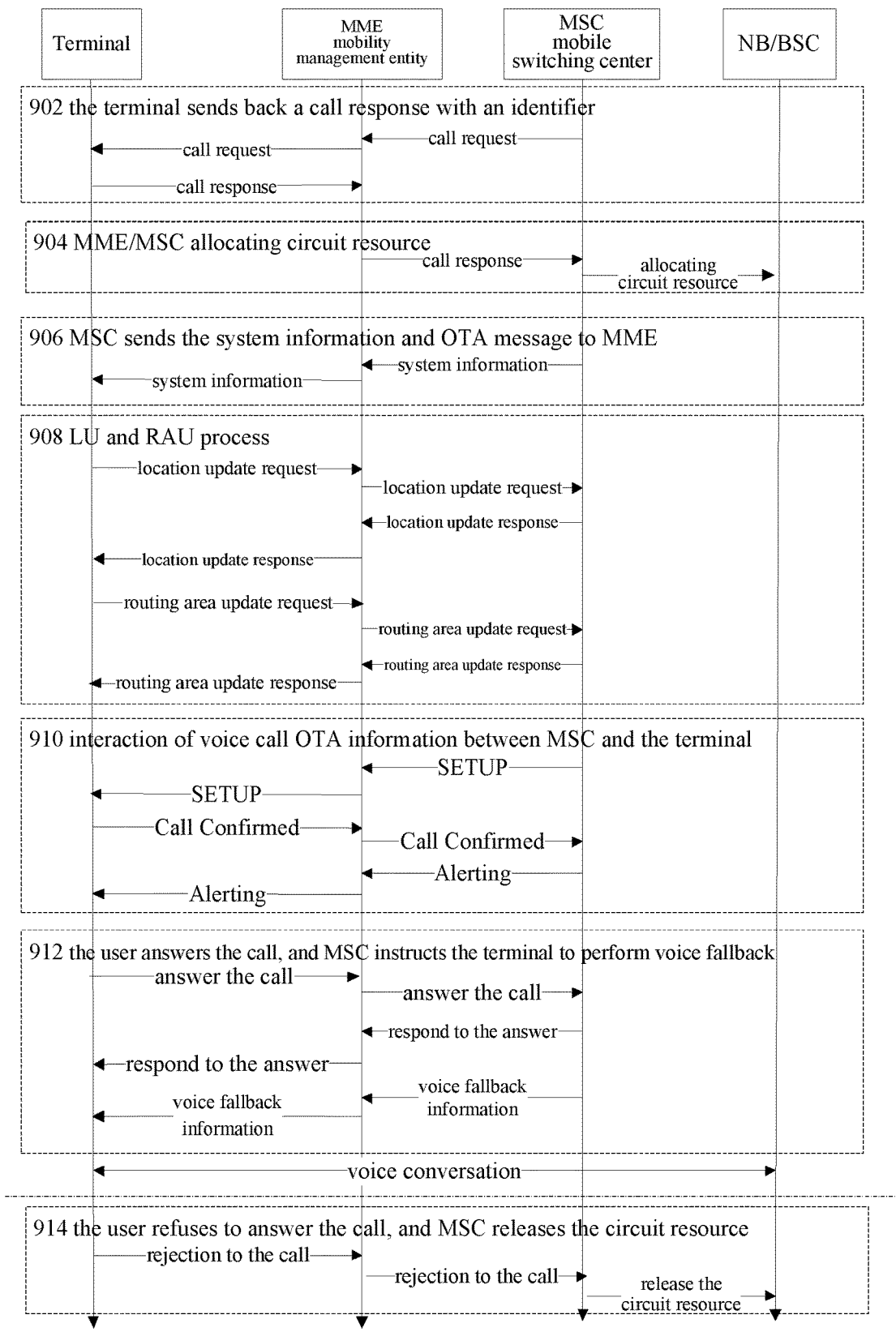
FIG. 9 shows a detailed flow chart of a service processing method in accordance with another embodiment of the present disclosure.

FIG. 9 shows a detailed flow chart of a service processing method in accordance with another embodiment of the present disclosure.

As shown in FIG. 9, the service processing method in accordance with the embodiment of the present disclosure has the following specific flow steps:

Step 902, the terminal sends back a call response with an identifier. After the terminal detects a Paging Request sent by the mobility management entity (MME) on LTE, it uses an identifier in the Extended Service Request sent back to the mobility management entity to indicate whether a voice call setup procedure can be completed on LTE.

Step 904, circuit resource is allocated. If the mobility management entity supports this identifier, a mobile switching center (MSC) of a 2G or 3G network is selected to allocate the circuit resource, and meanwhile the mobile switching center of the 2G or 3G network is notified to send OTA messages for the voice call and necessary system information to the mobility management entity. If the mobility management entity does not support this identifier, the terminal is instructed to directly fall back to a 2G or 3G network according to the conventional CSFB way.

Step 906, the mobile switching center sends the system information and the OTA messages to the mobility management entity. The mobile switching center sends the system information of the area where the 2G or 3G network is located to the terminal through the mobility management entity.

Step 908, location update and routing area update are conducted. If Location Update process and Routing Area Update process are required to be conducted between the mobile switching center (MSC) and the terminal, the OTA messages required to conduct these two processes are also encapsulated by the mobility management entity and relayed between the terminal and the mobile switching center. Wherein, in the processes, the 2G or 3G network needs to notify NB or BSC to allocate and keep necessary circuit resources, even if the terminal has not yet used them.

Step 910, the OTA messages are exchanged between the mobile switching center (MSC) and the terminal. Specifically, the mobility management entity sends the encapsulated SETUP message to the called terminal, the called terminal identifies the message and then starts the voice call setup procedure. In the call setup procedure as well as in the previous Step 806 and Step 808, the terminal stays on the LTE network all along, and is not required to be switched to a 2G or 3G network. After the terminal identifies the SETUP message, the terminal sends a Call-Confirmed message to the mobility management entity to be relayed to the mobile switching center. Likewise, the mobile switching center sends an Alerting message to the mobility management entity to be encapsulated and relayed to the terminal.

Step 912, the user answers the call, and the mobile switching center instructs the terminal to perform voice fallback. After the terminal receives the SETUP message, the terminal displays the calling number to the user for the user to decide whether or not to answer. If the user decides to answer the call, the terminal sends an answer request to the mobility management entity to be relayed to the mobile switching center. After the mobile switching center receives the answer request, the mobile switching center encapsulates the 2G or 3G cell tower information (frequency band and frequency range) into voice fallback information and sends the voice fallback information to the mobility management entity to be relayed to the terminal. In accordance with this voice fallback information, the terminal falls back to the 2G or 3G network and starts the voice conversation. As the circuit resource of the 2G or 3G network is readily available, the fallback can be completed very quickly.

Step 914, if the user refuses to answer the call, the terminal sends a call-rejection request to the mobility management entity to be relayed to the mobile switching center, and then the mobile switching center releases the circuit resource.

Figure 10:
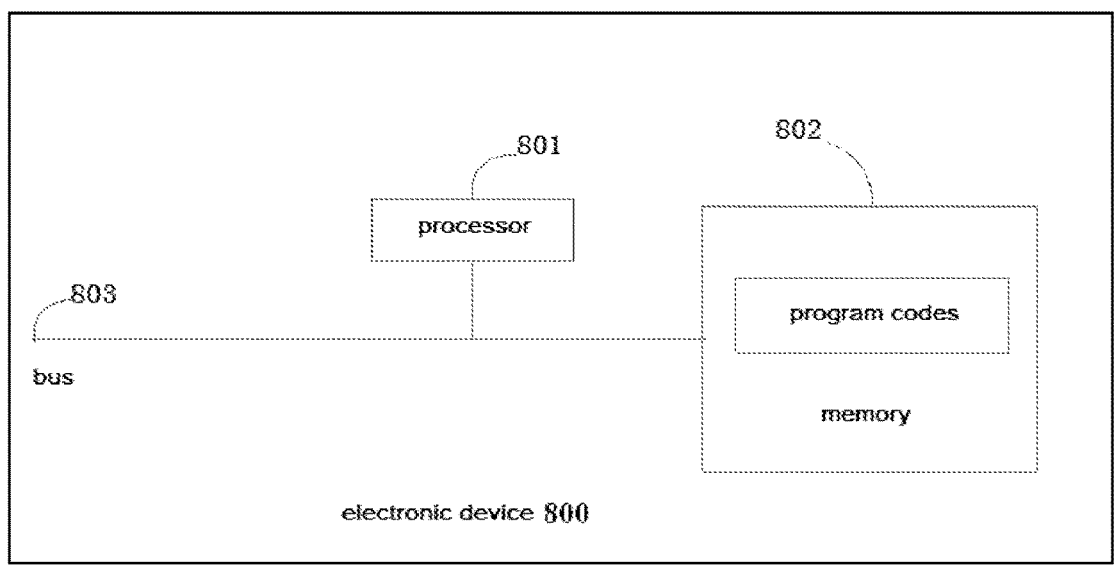
FIG. 10 shows a block diagram of an electronic device in accordance with an embodiment of the present disclosure.

FIG. 10 is a block diagram of an electronic device in accordance with an embodiment of the present disclosure.

As shown in FIG. 10, the electronic device 800 for service processing comprises a processor 801 and a memory 802 communicably connected with the processor 801 for program codes executable by the processor 801, the electronic device 800 also has a first communication network module and a second communication network module, the first communication network module being corresponding to a first communication network that only supports data service, the second communication network module being corresponding to a second communication network that at least supports voice service, wherein execution of the program codes by the processor 801 causes the processor 801 to carry out a voice call setup procedure on the first communication network if a call request from a mobility management entity is received when data service is being carried out by using the first communication network; receive circuit resource information of the second communication network required for establishing voice service corresponding to the call request sent by the mobility management entity; send an answer response to the mobility management entity, disconnect the data service of the first communication network according to voice fallback information received from the mobility management entity, and establish voice service of the second communication network by using the received circuit resource information, if it is detected that an answer button of the terminal is selected after the voice call setup procedure is completed. The at least one processor 801 and the memory 802 is communicably connected by a bus 803.

Preferably, the processor 801 is further caused to send a call response to the mobility management entity when the call request is received, wherein, the call response includes an identifier for indicating whether the voice call setup procedure can be completed on the first communication network, in order for the mobility management entity to judge whether the completion of the voice call setup procedure on the first communication network is supported according to the identifier.

In another embodiment, execution of the program codes by the processor 801 causes the processor 801 to receive a call request sent by a mobile switching center, and send the call request to a terminal; receive a call response sent by the terminal according to the call request, wherein, the call response includes an identifier for indicating whether a voice call setup procedure can be completed on a first communication network; judge whether the completion of the voice call setup procedure on the first communication network is supported by the mobility management entity according to the identifier in the call response; send the call response to the mobile switching center when it is judged that the completion of the voice call setup procedure on the first communication network is supported by the mobility management entity, in order for the mobile switching center to judge whether the completion of the voice call setup procedure on the first communication network is supported according to the identifier; receive parameter information required to carry out the voice call setup procedure as well as circuit resource information of a second communication network required for establishing voice service corresponding to the call request sent by the mobile switching center when it is judged that the completion of the voice call setup procedure on the first communication network is supported, and send the same to the terminal; receive an answer response sent by the terminal, and send the answer response to the mobile switching center.

Preferably, the parameter information includes system information, location update response information, routing area update response information, and/or SETUP information of an area where the second communication network is located, the second communication network being required to be switched to in order to carry out the voice service corresponding to the voice call setup procedure, and the processor 801 is further caused to send the system information to the terminal after receiving the system information sent by the mobile switching center, in order for the terminal to send a location update request and a routing area update request to the mobility management entity according to the system information; receive the location update request and the routing area update request, and send the location update request and the routing area update request to the mobile switching center; receive the location update response information and the routing area update response information sent by the mobile switching center in accordance with the location update request and the routing area update request, and send the location update response information and the routing area update response information to the terminal.

In another embodiment, execution of the program codes by the processor 801 causes the processor 801 to send a call request to a mobility management entity and receive a call response corresponding to the call request sent by the mobility management entity, wherein, the call response includes an identifier for indicating whether a voice call setup procedure can be completed on a first communication network; judge whether the completion of the voice call setup procedure on the first communication network is supported by the mobile switching center according to the identifier in the call response; allocate circuit resource information of a second communication network required for establishing voice service to a target terminal corresponding to the call request when it is judged that the completion of the voice call setup procedure on the first communication network is supported by the mobile switching center; send parameter information required to carry out the voice call setup procedure as well as the circuit resource information to the mobility management entity; receive an answer response sent by the mobility management entity, send voice fallback information to the mobility management entity in order for the mobility management entity to send the voice fallback information to the target terminal in order for the target terminal to disconnect data service of the first communication network according to the voice fallback information and establish voice service of the second communication network by using the received circuit resource information.

The technical solution of the present disclosure has been described in detail above with reference to the appended drawings. By means of the above-mentioned technical solutions, a tunnel for the OTA messages of the 2G or 3G network is provided through the LTE network, in order for the terminal to carry out a setup procedure for a voice call, so that the calling number can be known by the user and the user can decide whether or not to answer. In the situation of not answering, the data service on LTE would not be affected; if the user decides to answer, the user can do certain operation and safely exit the LTE data service.

The above described is just preferred embodiments of the present disclosure, and is not intended to limit the present disclosure. For those skilled in the art, the present disclosure can have various changes and modifications. Any changes, equivalent substitutions, modifications etc. made within the concept and principle of present disclosure should be embraced within the protection scope of the present disclosure.

The invention claimed is:

1. A service processing method, applicable to a terminal, comprising:
sending a call response to a mobility management entity if a call request from the mobility management entity is received when data service is being carried out by using a first communication network, wherein the first communication network only supports data service, the call response comprises an identifier for indicating whether a voice call setup procedure can be completed on the first communication network, in order for the mobility management entity to judge whether the completion of the voice call setup procedure on the first communication network is supported according to the identifier;
carrying out the voice call setup procedure on the first communication network according to parameter information required for carrying out the voice call setup procedure sent by the mobility management entity when it is judged that the completion of the voice call setup procedure on the first communication network is supported, wherein the parameter information comprises SETUP information, system information, location update response information and routing area update response information of an area where a second communication network is located, the second communication network at least supports voice service, and the voice call setup procedure comprises
receiving the SETUP information sent by the mobility management entity, wherein, the SETUP information comprises identification information, encoding mode information, and frequency band resource information sent by another terminal that sends the call request;
identifying the SETUP information for sending a SETUP response to the mobility management entity according to an identification result;
receiving the system information sent by the mobility management entity, sending a location update request and a routing area update request to the mobility management entity according to the system information, receiving the location update response information and the routing area update response information sent by the mobility management entity in accordance with the location update request and the routing area update request; and
receiving call reminder information sent by the mobility management entity, and providing an incoming call reminder in a preset reminding mode to a user of the terminal according to the call reminder information;
the method further comprises:
receiving circuit resource information of the second communication network required for establishing voice service corresponding to the call request sent by the mobility management entity;
if it is detected that an answer button of the terminal is selected after the voice call setup procedure is completed, sending an answer response to the mobility management entity, disconnecting the data service of the first communication network according to voice fallback information received from the mobility management entity, and establishing voice service of the second communication network by using the received circuit resource information.

2. The service processing method of claim 1, characterized in further comprising:
receiving voice fallback information sent by the mobility management entity when it is judged that the completion of the voice call setup procedure on the first communication network is not supported, and disconnecting the data service of the first communication network according to the voice fallback information, so as to carry out the voice call setup procedure on the second communication network.

3. The service processing method of claim 1, characterized in further comprising:
receiving voice fallback information sent by the mobility management entity when the circuit resource information is sent by the mobility management entity; or
receiving voice fallback information sent by the mobility management entity when the answer response is received by the mobility management entity.

4. A service processing method, applicable to a mobility management entity, characterized in comprising:
receiving a call request sent by a mobile switching center, and sending the call request to a terminal;
receiving a call response sent by the terminal according to the call request, wherein, the call response comprises an identifier for indicating whether a voice call setup procedure can be completed on a first communication network, wherein the first communication network only supports data service, and parameter information required to carry out the voice call setup procedure comprises SETUP information, system information, location update response information and routing area update response information of an area where a second communication network is located, the second communication network at least supports voice service;

judging whether the completion of the voice call setup procedure on the first communication network is supported by the mobility management entity according to the identifier in the call response;

sending the call response to the mobile switching center when it is judged that the completion of the voice call setup procedure on the first communication network is supported by the mobility management entity, in order for the mobile switching center to judge whether the completion of the voice call setup procedure on the first communication network is supported according to the identifier;

receiving the SETUP information required to carry out the voice call setup procedure and circuit resource information of the second communication network required for establishing voice service corresponding to the call request sent by the mobile switching center when it is judged that the completion of the voice call setup procedure on the first communication network is supported, and sending the SETUP information to the terminal;

receiving a SETUP response sent by the terminal according to the SETUP information, and sending the SETUP response to the mobile switching center;

sending the system information to the terminal after receiving the system information sent by the mobile switching center, in order for the terminal to send a location update request and a routing area update request to the mobility management entity according to the system information;

receiving the location update request and the routing area update request, and sending the location update request and the routing area update request to the mobile switching center;

receiving the location update response information and the routing area update response information sent by the mobile switching center in accordance with the location update request and the routing area update request, and sending the location update response information and the routing area update response information to the terminal;

receiving call reminder information sent by the mobile switching center, and sending the call reminder information to the terminal;

receiving an answer response sent by the terminal, and sending the answer response to the mobile switching center;

receiving voice fallback information sent by the mobile switching center when the circuit resource information is sent by the mobile switching center, or receiving voice fallback information sent by the mobile switching center when the answer response is received by the mobile switching center; and sending the voice fallback information to the terminal.

5. The service processing method of claim 4, characterized in that, the method further comprising:
receiving a rejection response sent by the terminal, and sending the rejection response to the mobile switching center.

6. A service processing method, applicable to a mobile switching center, characterized in comprising:
sending a call request to a mobility management entity and receiving a call response corresponding to the call request sent by the mobility management entity, wherein, the call response comprises an identifier for indicating whether a voice call setup procedure can be completed on a first communication network, wherein the first communication network only supports data service, and parameter information required to carry out the voice call setup procedure comprises SETUP information, system information, location update response information and routing area update response information of an area where a second communication network is located, the second communication network at least supports voice service;

judging whether the completion of the voice call setup procedure on the first communication network is supported by the mobile switching center according to the identifier in the call response;

allocating circuit resource information of the second communication network required for establishing voice service to a target terminal corresponding to the call request when it is judged that the completion of the voice call setup procedure on the first communication network is supported by the mobile switching center;

sending the SETUP information required to carry out the voice call setup procedure and the circuit resource information to the mobility management entity;

receiving a SETUP response sent by the mobility management entity, and sending call reminder information to the mobility management entity according to the SETUP response;

sending the system information to the mobility management entity;

receiving a location update request and a routing area update request sent by the mobility management entity;

sending the location update response information and the routing area update response information to the mobility management entity in accordance with the location update request and the routing area update request;

receiving an answer response sent by the mobility management entity, sending voice fallback information to the mobility management entity in order for the mobility management entity to send the voice fallback information to the target terminal in order for the target terminal to disconnect data service of the first communication network according to the voice fallback information and establish voice service of the second communication network by using the received circuit resource information.

7. The service processing method of claim 6, characterized in that, the method further comprising:
receiving a rejection response sent by the mobility management entity, and release the allocated circuit resource according to the rejection response.

8. The service processing method of claim 6, characterized in further comprising:
sending the voice fallback information to the mobility management entity when sending the circuit resource information, or sending the voice fallback information to the mobility management entity when the answer response is received.

9. An electronic device, comprising a processor and a memory communicably connected with the processor for storing program codes executable by the processor, wherein, execution of the program codes by the processor causes the processor to send a call response to a mobility management entity if a call request from the mobility management entity is received when data service is being carried out by using a first communication network, wherein the first communication network only supports data service, the call response comprises an identifier for indicating whether a voice call setup procedure can be completed on the first communication network, in order for the mobility management entity to judge whether the completion of the voice call setup procedure on the first communication network is supported according to the identifier;

carry out the voice call setup procedure on the first communication network according to parameter information required for carrying out the voice call setup procedure when it is judged that the completion of the voice call setup procedure on the first communication network is supported, wherein the parameter information comprises SETUP information, system information, location update response information and routing area update response information of an area where a second communication network is located, the second communication network at least supports voice service, and the voice call setup procedure comprises receiving SETUP information sent by the mobility management entity, wherein the SETUP information comprises identification information, encoding mode information and frequency band resource information of another terminal that sends the call request;

identifying the SETUP information for sending a SETUP response to the mobility management entity according to an identification result;

receiving the system information sent by the mobility management entity, sending a location update request and a routing area update request to the mobility management entity according to the system information, receiving the location update response information and the routing area update response information sent by the mobility management entity in accordance with the location update request and the routing area update request; and receiving call reminder information sent by the mobility management entity, and providing an incoming call reminder in a preset reminding mode to a user of the terminal according to the call reminder information;

receive circuit resource information of the second communication network required for establishing voice service corresponding to the call request sent by the mobility management entity;

if it is detected that an answer button of the terminal is selected after the voice call setup procedure is completed, send an answer response to the mobility management entity, disconnect the data service of the first communication network according to voice fallback information received from the mobility management entity, and establish voice service of the second communication network by using the received circuit resource information.

10. An electronic device, characterized in comprising a processor and a memory communicably connected with the processor for storing program codes executable by the processor, wherein, execution of the program codes by the processor causes the processor to receive a call request sent by a mobile switching center, and send the call request to a terminal;

receive a call response sent by the terminal according to the call request, wherein, the call response includes an identifier for indicating whether a voice call setup procedure can be completed on a first communication network, wherein the first communication network only supports data service, and parameter information required to carry out the voice call setup procedure comprises SETUP information, system information, location update response information and routing area update response information of an area where a second communication network is located, the second communication network at least supports voice service;

judge whether the completion of the voice call setup procedure on the first communication network is supported by the mobility management entity according to the identifier in the call response;

send the call response to the mobile switching center when it is judged that the completion of the voice call setup procedure on the first communication network is supported by the mobility management entity, in order for the mobile switching center to judge whether the completion of the voice call setup procedure on the first communication network is supported according to the identifier;

receive the SETUP information required to carry out the voice call setup procedure as well as circuit resource information of the second communication network required for establishing voice service corresponding to the call request sent by the mobile switching center when it is judged that the completion of the voice call setup procedure on the first communication network is supported, and send the SETUP information to the terminal;

receive a SETUP response sent by the terminal according to the SETUP information, and send the SETUP response to the mobile switching center;

send the system information to the terminal after receiving the system information sent by the mobile switching center, in order for the terminal to send a location update request and a routing area update request to the mobility management entity according to the system information;

receive the location update request and the routing area update request, and send the location update request and the routing area update request to the mobile switching center;

receive the location update response information and the routing area update response information sent by the mobile switching center in accordance with the location update request and the routing area update request, and send the location update response information and the routing area update response information to the terminal;

receive call reminder information sent by the mobile switching center, and send the call reminder information to the terminal;

receive an answer response sent by the terminal, and send the answer response to the mobile switching center;

receive voice fallback information sent by the mobile switching center when the circuit resource information is sent by the mobile switching center, or receive voice fallback information sent by the mobile switching center when the answer response is received by the mobile switching center; and send the voice fallback information to the terminal.

11. An electronic device, characterized in comprising a processor and a memory communicably connected with the processor for storing program codes executable by the processor, wherein, execution of the program codes by the processor causes the processor to
- send a call request to a mobility management entity and receive a call response corresponding to the call request sent by the mobility management entity, wherein, the call response includes an identifier for indicating whether a voice call setup procedure can be completed on a first communication network, wherein the first communication network only supports data service, and parameter information required to carry out the voice call setup procedure comprises SETUP information, system information, location update response information and routing area update response information of an area where a second communication network is located, the second communication network at least supports voice service;
- judge whether the completion of the voice call setup procedure on the first communication network is supported by the mobile switching center according to the identifier in the call response;
- allocate circuit resource information of the second communication network required for establishing voice service to a target terminal corresponding to the call request when it is judged that the completion of the voice call setup procedure on the first communication network is supported by the mobile switching center;
- send the SETUP information required to carry out the voice call setup procedure as well as the circuit resource information to the mobility management entity;
- receive a SETUP response sent by the mobility management entity, and send call reminder information to the mobility management entity according to the SETUP response;
- send the system information to the mobility management entity;
- receive a location update request and a routing area update request sent by the mobility management entity;
- send the location update response information and the routing area update response information to the mobility management entity in accordance with the location update request and the routing area update request;
- receive an answer response sent by the mobility management entity, send voice fallback information to the mobility management entity in order for the mobility management entity to send the voice fallback information to the target terminal in order for the target terminal to disconnect data service of the first communication network according to the voice fallback information and establish voice service of the second communication network by using the received circuit resource information.

* * * * *